United States Patent
Mori

[19]

[11] Patent Number: 6,137,590
[45] Date of Patent: *Oct. 24, 2000

[54] IMAGE FORMING APPARATUS AND IMAGE FORMING SYSTEM

[75] Inventor: Nobuyasu Mori, Tokyo, Japan

[73] Assignee: Kyocera Corporation, Kyoto, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,768

[22] Filed: Sep. 26, 1997

[30] Foreign Application Priority Data

| Sep. 30, 1996 | [JP] | Japan | 8-258116 |
| May 29, 1997 | [JP] | Japan | 9-140140 |
| May 29, 1997 | [JP] | Japan | 9-140141 |
| May 29, 1997 | [JP] | Japan | 9-140142 |
| Jun. 5, 1997 | [JP] | Japan | 9-005296 |
| Jun. 5, 1997 | [JP] | Japan | 9-147922 |
| Jun. 6, 1997 | [JP] | Japan | 9-148800 |
| Jun. 6, 1997 | [JP] | Japan | 9-148801 |
| Jul. 30, 1997 | [JP] | Japan | 9-205041 |
| Jul. 30, 1997 | [JP] | Japan | 9-205042 |
| Jul. 30, 1997 | [JP] | Japan | 9-205043 |
| Jul. 30, 1997 | [JP] | Japan | 9-205044 |

[51] Int. Cl.$^7$ ................................ H04N 7/00

[52] U.S. Cl. .............. 358/1.17; 270/1.01; 270/52.01; 270/52.02; 270/52.03; 270/52.05; 358/403; 395/115; 395/116; 395/106; 395/117; 382/182; 382/183; 382/305; 382/306

[58] Field of Search .................... 270/1.01, 52.01, 270/52.02, 52.03, 52.05; 358/403, 1.17; 382/317, 182, 183, 305, 306; 395/115, 116, 106, 117

[56] References Cited

U.S. PATENT DOCUMENTS

| 4,268,159 | 5/1981 | Tashiro | 355/3 |
| 4,408,181 | 10/1983 | Nakayama . | |
| 4,455,039 | 6/1984 | Weitzen et al. | 283/83 |
| 4,829,166 | 5/1989 | Froelich | 235/379 |
| 5,243,381 | 9/1993 | Hube | 355/204 |
| 5,316,279 | 5/1994 | Corona et al. | 270/1.1 |
| 5,383,029 | 1/1995 | Kojima | 358/403 |
| 5,513,922 | 5/1996 | Umbach | 400/691 |
| 5,553,312 | 9/1996 | Gattey et al. | 455/11.1 |
| 5,561,528 | 10/1996 | Johnson et al. | 358/296 |
| 5,630,062 | 5/1997 | Okutsu | 709/200.3 |
| 5,699,493 | 12/1997 | Davidson et al. | 358/1.15 |
| 5,754,308 | 5/1998 | Lopresti et al. | 358/403 |
| 5,822,083 | 10/1998 | Ito et al. | 358/403 |
| 5,841,885 | 11/1998 | Neff et al. | 382/112 |

FOREIGN PATENT DOCUMENTS

| 0258488 | 9/1986 | European Pat. Off. . |
| 0544598 | 11/1992 | European Pat. Off. . |
| 0544598 | 6/1993 | European Pat. Off. . |
| 0621721 | 4/1994 | European Pat. Off. . |
| 0621721 | 10/1994 | European Pat. Off. . |
| 0622757 | 11/1994 | European Pat. Off. . |
| 0258488 | 3/1988 | Germany . |
| 59-121070 | 7/1984 | Japan . |
| 3162979 | 7/1991 | Japan . |
| 04146458 | 5/1992 | Japan . |
| 4205225 | 7/1992 | Japan . |
| 7244657 | 9/1995 | Japan . |
| 2248129 | 3/1992 | United Kingdom . |

*Primary Examiner*—Joseph Mancuso
*Assistant Examiner*—F. E. Cooperrider
*Attorney, Agent, or Firm*—Hogan & Hartson LLP

[57] ABSTRACT

An image forming apparatus comprises an identification code assignment section for assigning an identification code for each page unit or print job unit of print images, a printing section for printing the print image and its corresponding identification code on a recording medium, a storage section for storing the print images and their corresponding identification codes, and an identification code read section for reading the identification code printed on the recording medium. The print image corresponding to the identification code read through said identification code read section is taken out from said storage section and the print image or the print image with the identification code are printed on a recording medium in said printing section.

23 Claims, 16 Drawing Sheets

IMAGE FORMING APPARATUS AND IMAGE FORMING SYSTEM

BACKGROUND OF THE INVENTION

1. Field of the Invention

This invention relates to an image forming apparatus, such as a printer, for receiving image data, which is printable data including characters, figures, symbols, lines or the like, from an external machine, converting the received image data into a print image, and printing the image.

This invention further relates to an image forming system comprising an external machine, such as a personal computer, for preparing image data and an image forming unit as described above.

This invention also relates to an image forming system as described above that further includes an information processing unit and a terminal adapter unit for executing speed conversion and protocol conversion and conducting wireless or wire data communication with the external machine.

2. Conventional Art

Upon reception of image data from an external machine such as a personal computer or a host computer, a conventional image forming unit forms a print image based on the received image data and prints as many copies as instructed from the external machine.

FIG. 25 is a schematic block diagram shown a conventional image forming unit. The image forming unit 21 comprises an interface ("I/F") section 22 for receiving image data from an external machine; a data conversion section 23 for converting the image data received into print data, a storage section 24 for storing programs that control the image forming unit 21, font data required for the data conversion section 23, and the like; a printing section 25 for printing the data from the data conversion section 23; and a control section 26 for controlling the other sections.

However after printing a particular image, the conventional image forming unit erases all data related to the image. Thus, to re-print the same image, the print command must once again be in issued from the information processing unit. If the image data is not stored in a floppy disk, a hard disk, or the like, the printed paper must be copied by a copy machine. However, copying on a copy machine does not provide the same high resolution as does generating the print data from the information processing unit.

SUMMARY OF THE INVENTION

In view of the above problems, it is an object of the present invention to provide an image forming apparatus which is capable of re-printing an image with the same resolution as the original printing in a short period of time. It is to be noted that "re-printing" describes the process of printing an image that has already been printed at least once by the image forming apparatus.

According to the present invention, an image forming apparatus for printing image data comprises an identification code assignment section for assigning an identification code for each page unit or print job unit of a print image, a printing section for printing the print image and its corresponding identification code on a recording medium, a storage section for storing the print image and its corresponding identification code, and an identification code read section for reading the identification code printed on the recording medium. In the image forming apparatus, the print image corresponding to the identification code read by the identification code read section is retrieved from the storage section and the print image, either with or without the identification code, is printed on the recording medium by the printing section.

DETAILED DESCRIPTION OF PREFERRED EMBODIMENTS

Referring now to the accompanying drawings, preferred embodiments of the invention will be described.

First Embodiment

Figure 1:
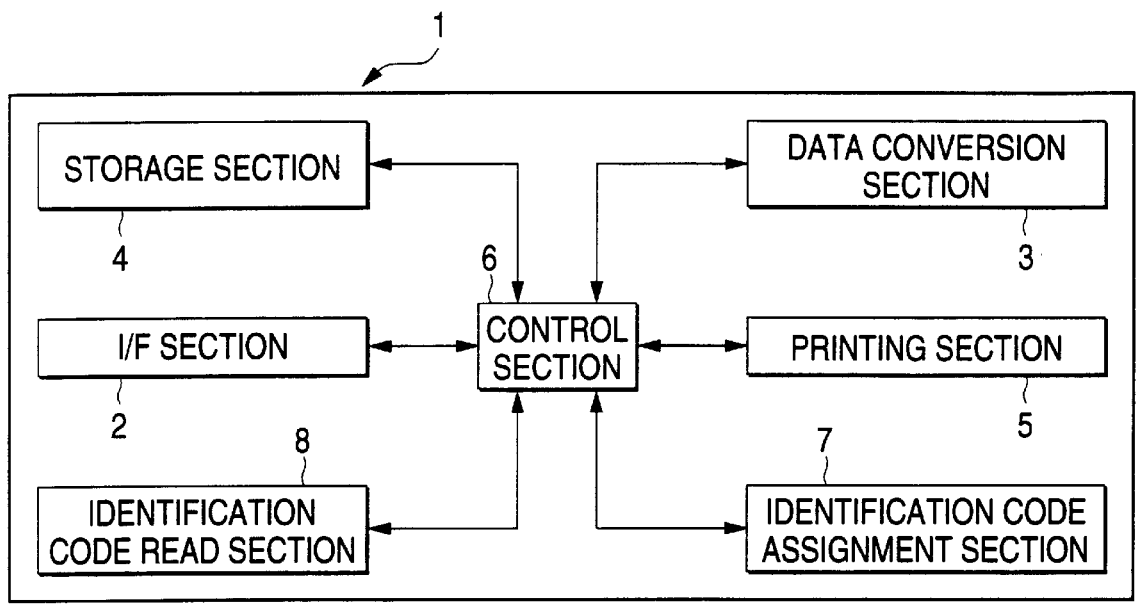
FIG. 1 is a schematic block diagram showing an embodiment of an image forming apparatus according to the invention.

FIG. 1 is a schematic block diagram showing an embodiment of an image forming apparatus according to the invention where the identification code read section 8 is integral to the image forming apparatus 1. The image forming apparatus 1 comprises an I/F section 2, a data conversion section 3, a storage section 4, a printing section 5, a control section 6, an identification code assignment section 7, and an identification code read section 8.

The I/F section 2 is connected to a computer (not shown) or the like, via a cable to receive image data to be printed from the computer.

The data conversion section 3 converts the image data received by the I/F section 2 into data that can be printed by the printing section 5.

The identification code assignment section 7 assigns an identification code to the print image for each page or each print job unit (namely, file unit). The information contained in the identification code may be the serial number of the image forming apparatus 1, the serial number of the document, a password, etc. These information pieces may be compressed, encoded, and assigned as a bar code, for example.

The storage section 4 stores the programs required to control the entire image forming apparatus 1, font data required for the data conversion section 3, print images printed in the printing section 5, and the identification codes assigned to the print images for each page unit or print job unit.

The printing section 5 prints the data provided by the data conversion section 3 on a recording medium, and also prints the identification code assigned by the identification code assignment section 7 on the recording medium at the same time. In the embodiments, the recording medium 10 may be paper or any other flexible sheet material, such as a plastic sheet material that is flexible and sturdy like paper.

The control section 6 controls the entire image forming apparatus 1.

The identification code read section 8 reads the identification code printed on a recording medium. For example, this read section may be a bar-code reader if the identification code is a bar code.

According to the invention, a print image and an identification code are printed on the recording medium and at the same time, and they are also stored in the storage section 4. Thus, if it becomes necessary re-print the image, the identification code printed on the recording medium can be read by the identification code read section 8, and the print image retained by the storage section 4 can be re-printed any number of times.

The identification code may be printed in a number of formats. The actual format of printing the code may be pre-set or the image forming apparatus may include a means for selecting a given format of printing or may be a combination thereof. Examples of formats are as follows:

(1) The identification code may be printed on all pages of the recording medium, in which case any particular page in the document could be selected for reprinting.

(2) The identification code may be printed only on the first page of the recording medium, and not on the remaining pages in the document. Where an identification code is assigned for an entire print job, it is not necessary to print the same identification code on the subsequent pages.

(3) The identification code may be printed on a trailer page following the last page of a document or print image. That is, in case of 2-page document, the identification code is printed on a third page, the trailer page. In this case the identification code is not printed on the document or print image itself.

(4) The identification code may be printed on the back face of the recording medium opposite the front face on which the print image is printed. In this case the identification code is not printed on the front face of the recording medium.

(5) Where the identification code is read by the identification code read section 8, only the print image is printed on the recording medium and not the identification code. By using this format, a printed page with an identification code on it can be recognized as the original and a printed page with no identification code can be recognized as a re-print where the identification code was read by the identification code read section 8.

(6) Where the identification code is read through the identification code read section 8, both the print image and the identification code may be printed on the recording medium. In this case, each page of the re-print can be read through the identification code read section.

These format options apply to the first embodiment and to any subsequent embodiments unless expressly eliminated by the inherent operation of an embodiment.

In certain embodiments, the image forming apparatus of the invention includes a network control means capable of accessing other external machines and a read and output means capable of reading and outputting the print images of other units. In these embodiments, documents of other image forming apparatus can also be printed and print images can be shared because the serial number of each image forming apparatus is contained in the identification code. If, for example, the serial number of the image forming apparatus is printed in an alphanumeric character string and the correspondence between the alphanumeric strings and the serial numbers is indicated, it can be determined which image forming apparatus prints the print document. If the identification code is read through the identification code read section 8 of the image forming apparatus, the document can be re-printed from memory.

In other embodiments, the image forming apparatus is connected to a host computer, and includes means that responds to search, retrieval, and output instructions from the host computer, and the host computer manages files and lists the stored print image contents.

In certain embodiments, the image forming apparatus includes a means that responds to a copy-protect instruction from the host computer and the security of print images can be maintained.

Further, an embodiment of the image forming apparatus which prints bar codes as identification codes will be discussed.

Figure 2:
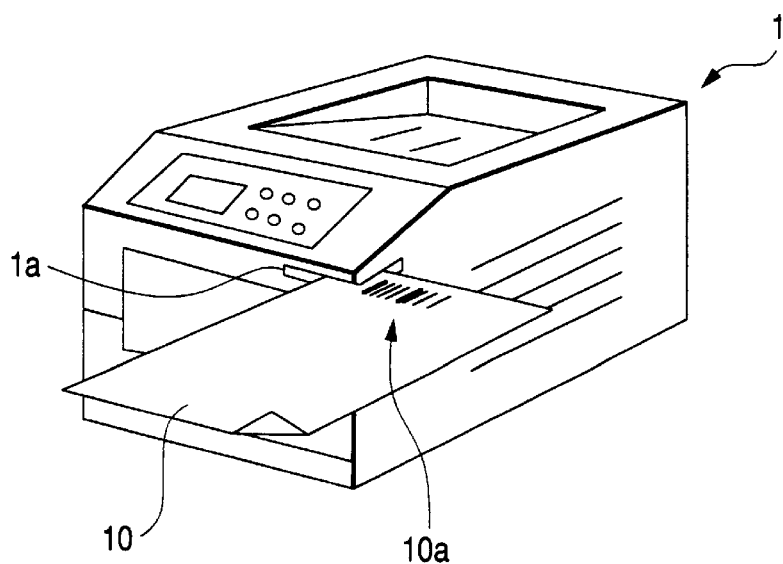
FIG. 2 is a perspective view showing a first embodiment of the image forming apparatus of the invention.

FIG. 2 shows a printer according to a first embodiment of the image forming apparatus of the invention. The printer 1 includes the main components of an I/F section (interface section) 2, a data conversion section 3, a storage section 4, a printing section 5, a control section 6, an identification code assignment section 7, and an identification code read section 8.

The identification code read section 8 reads the identification code printed on the recording medium 10. This read section 8 may be a bar-code reader where the identification code is in bar-code format. In this embodiment, the bar-code reader is placed facing the inside of a slit 1, in the outside of the printer 1, as shown in FIG. 2. The recording medium 10 is passed through the slit 1a, and the bar-code reads the bar code 10a printed on the recording medium 10. The bar-code reader is a sensor for executing photoelectric conversion of the bar code 10a and reading the result of the conversion. The reader operates on general photoelectric conversion principles whereby the bar code is irradiated with laser light, infrared light, etc., the sensor reads the reflected light from the bar code, executes photoelectric conversion, and determines the bar code contents electrically.

The following read systems using such photoelectric conversion are available for use in this embodiment:

(a) An optical scanning system for scanning a narrowed light source over a bar code and reading the reflected light from the bar code by a sensor. Examples include laser scanning, flying spot, and the like.

(b) A self-scanning sensor system having a large number of pixels that read bar codes. Examples include CCDs, photodiode arrays, and the like.

(c) A mechanical scanning system that moves a carriage on which a light source and a photo sensor are mounted, thereby reading bar codes.

The following have been tested and used as read systems:
(1) Flat bed scanner
(2) Original bed move scanner
(3) Drum scanner
(4) Bar code move scanner
(5) Camera scanner
(6) Manual scanner The system for moving the bar code 10a (recording medium 10), irradiating the bar code 10a and reading the reflected light therefrom, the camera system using CCDs, and the like to read the entire bar code 10a as a unit, can be used as the bar-code reader in the first embodiment or any subsequent embodiments unless expressly eliminated by the inherent operation of an embodiment. Further, any of the above-mentioned systems may be used as the read system for any subsequent embodiments and any identification printing formats previously described herein can be used for any subsequent embodiments in this point, the same also applies to the following embodiments.

The printer 1 according to the first embodiment can re-print from memory any number of times simply by passing the recording medium 10 through the slit 1a, thus no external machine is necessary for printing. Further, the time lag before printing begins is shortened and the operability of the printer 1 can be improved remarkably.

Second Embodiment

Figure 3:
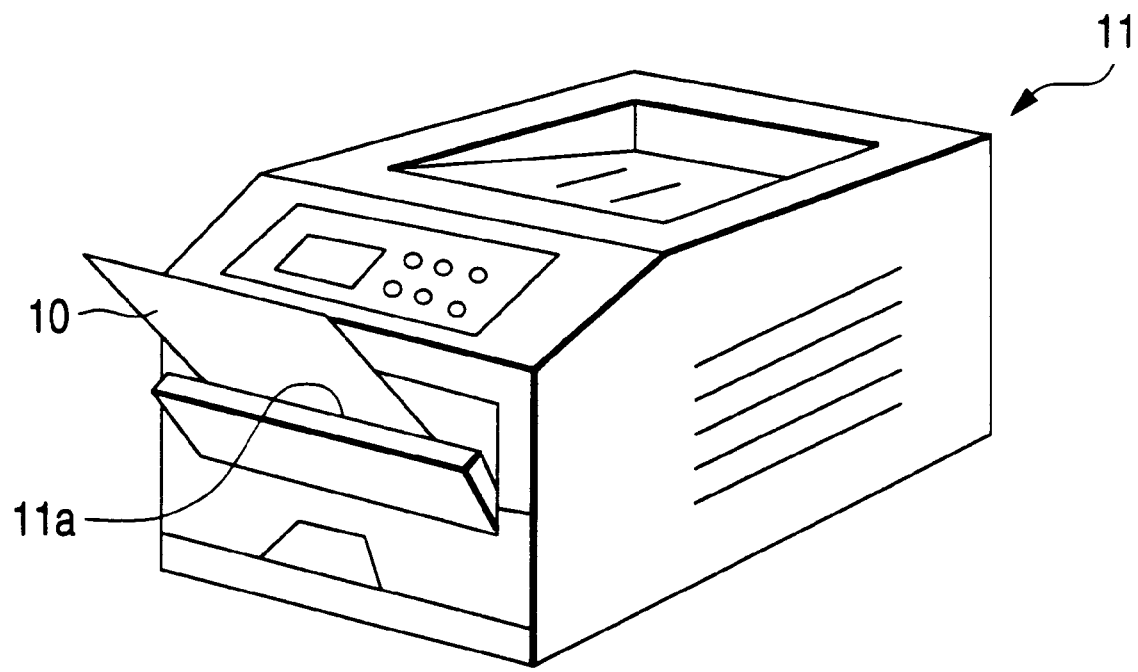
FIG. 3 is a perspective view of a second embodiment of the image forming apparatus of the invention.

FIG. 3 shows printer 11 according to a second embodiment of the invention. The second embodiment differs from the first embodiment in that a bar-code reader (identification code read section 8 in FIG. 1) is mounted in a region of a recording medium feed passage 11a into which the recording medium 10 is manually fed. The recording medium includes a bar-code (not shown) that is read by the internally mounted reader (not shown) as the recording medium is fed into the feed passage 11a.

The print image corresponding to the bar code is retrieved from the storage section 4 and is re-printed.

This embodiment includes no external machine, thus the lag time before printing is shortened.

This second embodiment can include any mechanism for moving the bar code, irradiating the bar code and reading from the bar code, as described herein or commonly known.

Third Embodiment

Figure 4:
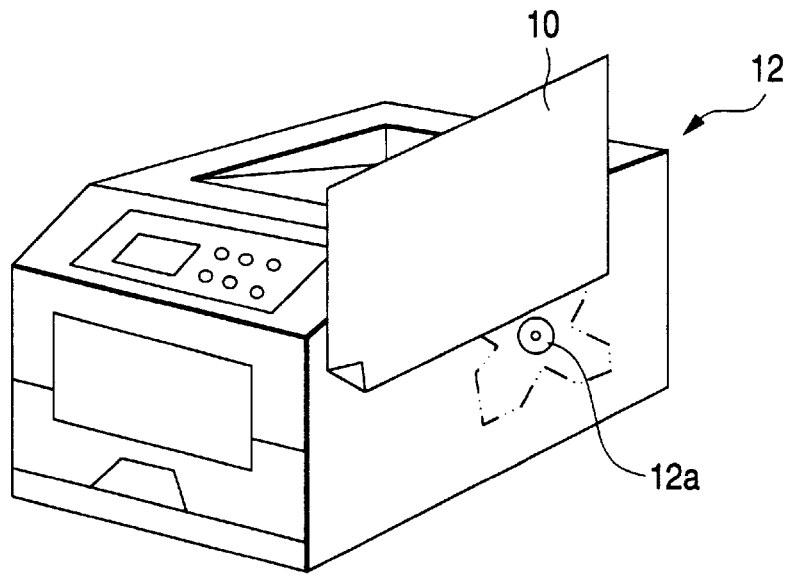
FIG. 4 is a perspective view showing a third embodiment of the image forming apparatus of the invention.

FIG. 4 is an illustration showing a printer 12 according to a third embodiment of the invention. In the third embodiment, a bar-code reader 12a (identification code read section 8 of FIG. 1) is disposed in a region of the external surface of the printer 12 and a bar code 10a on the recording medium 10 is brought within read distance of the bar-code reader 12a. The bar-code reader 12a reads the bar code and the print image corresponding to the bar code is retrieved from storage memory and re-printed.

The third embodiment of the configuration does not include an external machine, thus it has the resulting benefits previously described for such configurations.

In the third embodiment, the camera system can be used as the bar-code reader 12a. Any other read system may be used as described above if unless operationally inapplicable. Any embodiments of bar-code movement, irradiation and reading described herein or commonly known can be incorporated into this configuration.

Fourth Embodiment

Figure 5:
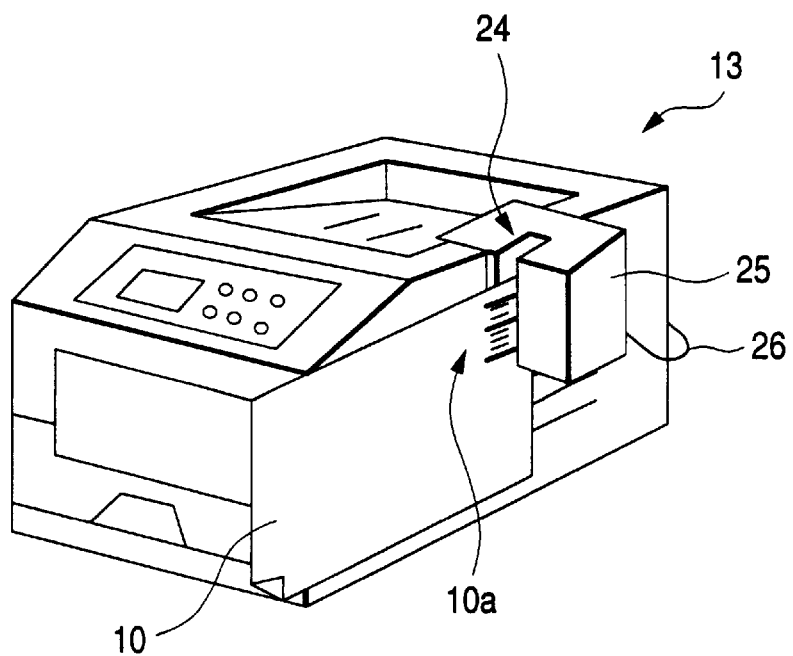
FIG. 5 is a perspective view showing a fourth embodiment of the image forming apparatus.
Figure 6:
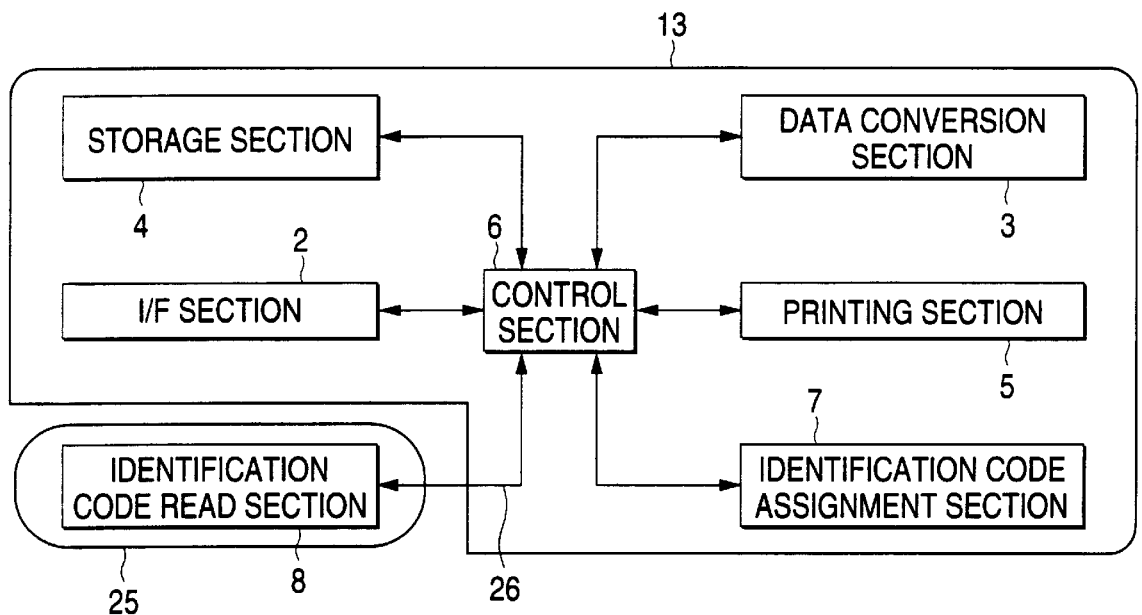
FIG. 6 is a block diagram showing a general configuration of the embodiment of FIGS. 5, 7 and 8.

FIGS. 5 and 6 show a printer 13 according to a fourth embodiment of the invention. This embodiment is distinguished from the first to third embodiments, where the identification code read section 8 is integral with the printer 1, 11, 12. In contrast, the fourth embodiment includes a bar-code reader 25 (identification code read section 8) that is a device separate from the printer 13. In the fourth embodiment, the external device 25 is connected to the printer 13 via wiring 26. The reader includes a slit 24 through which recording medium 10 with a bar code 10a to be read is passed.

Again, the fourth embodiment includes no external machine to enable the printer 13, and thus has the resulting benefits previously described.

In the fourth embodiment, the system for moving the bar code 10a or the camera system can be used as the bar-code reader 25. Any other read system may described herein or commonly known can be used.

Fifth Embodiment

FIG. 6 shows a schematic block diagram of an embodiment that differs from previous embodiments in that the identification code read section 28 is a device separate from the printer, operationally and electrically connected by a wire 26. FIG. 6 applies to the fifth and sixth embodiments.

Figure 7:
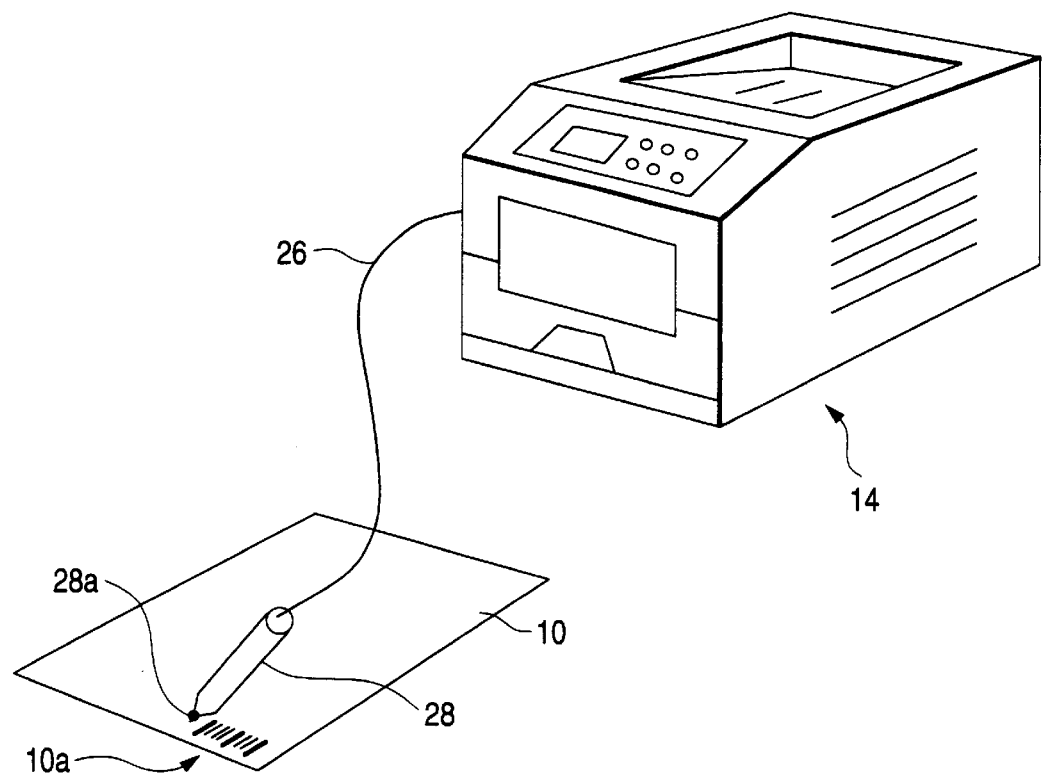
FIG. 7 is a perspective view showing a fifth embodiment of the image forming apparatus of the invention.

FIG. 7 shows printer 14 according to the fifth embodiment of the invention. In this embodiment, the separate code read device is a pen 28 that includes a bar-code reader 28a at its tip.

According to the fifth embodiment, the pen 28 containing the bar-code reader 28a slides across the bar code 10a on the recording medium 10 in a direction perpendicular to the lines of the bar code 10a. Thus, the print image corresponding to the bar code 10a is retrieved from storage and re-printed.

Again, no external machine is required. Any other read system may be used as described above if it can be operationally applied.

Sixth Embodiment

Figure 8:
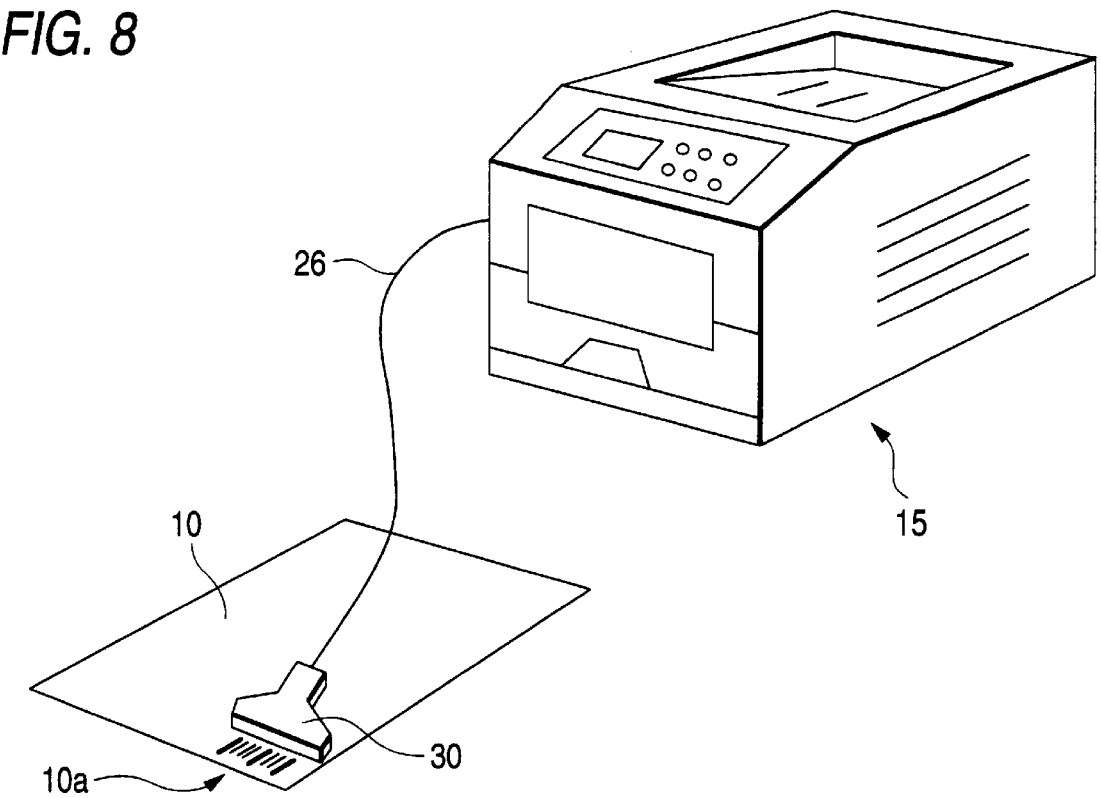
FIG. 8 is a perspective view showing a sixth embodiment of the image forming apparatus of the invention.

FIG. 8 is an illustration to show a printer 15 according to a sixth embodiment of the invention. In the sixth embodiment the external read device is a bar code reader that can read the entire bar code at once, as opposed to line by line as in the device of the fifth embodiment. In the sixth embodiment, the bar code reader 30 slides over the bar code 10a in a direction parallel to the bar code lines to read the code.

Again, no external machine is required.

In the sixth embodiment, an infrared scanner or a camera system can be used as the bar-code reader 30. Any other read system may be used as described above if it can be operationally applied.

Seventh Embodiment

Figure 10:
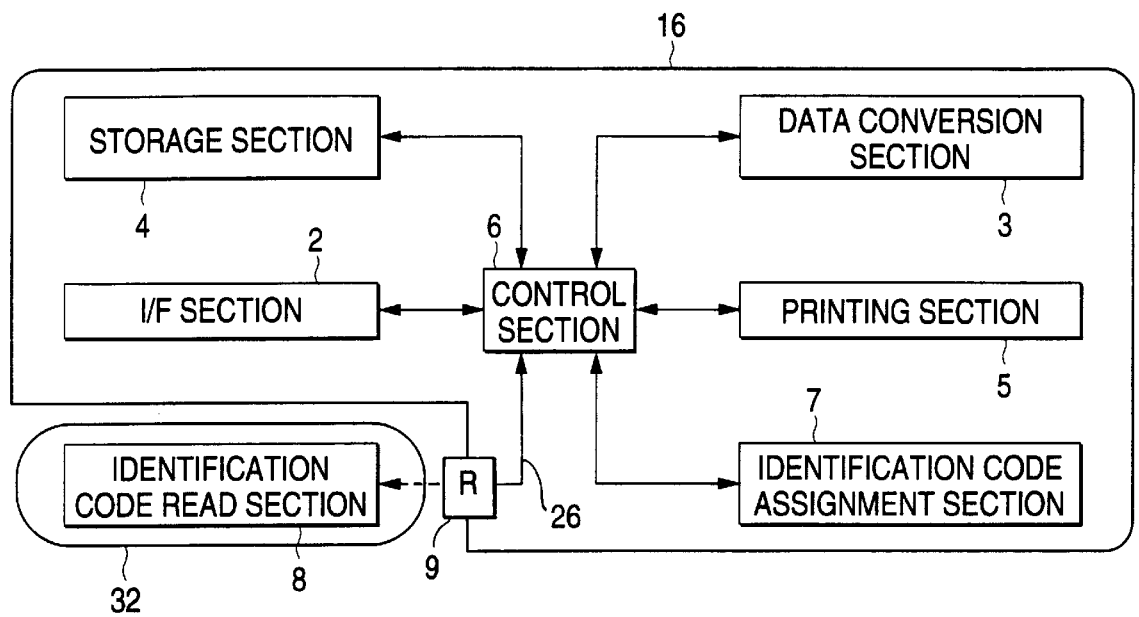
FIG. 10 is a block diagram showing a general configuration of the embodiment of FIGS. 9 and 11.

FIG. 10 is a schematic block diagram of an embodiment that differs from the embodiments corresponding to the schematic of FIG. 6 in that FIG. 10 does not include a wire connection between the identification code read section and the control section of the printer. Instead, the separate read section communicates with the printer via a radio signal received by a receiver 9 associated with the printer 16 and wired thereto. The schematic of FIG. 10 applies to the seventh and eighth embodiments.

Figure 9:
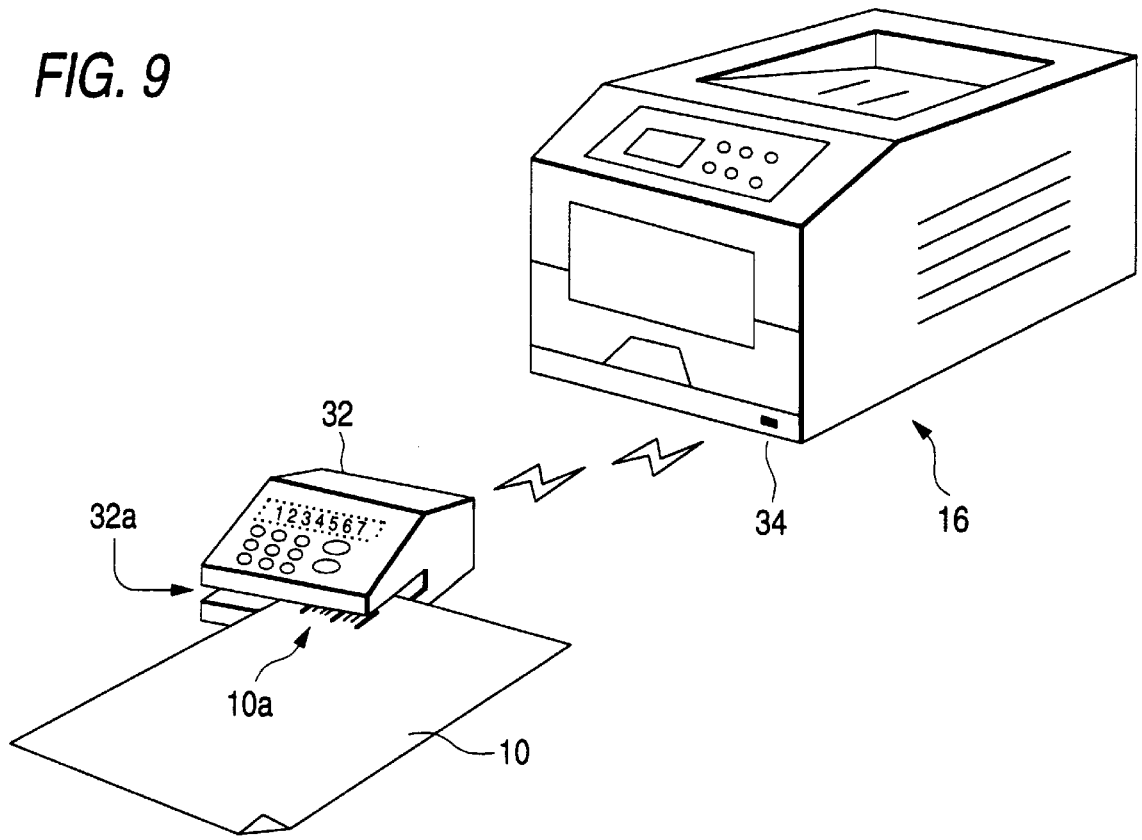
FIG. 9 is a perspective view showing a seventh embodiment of the image forming apparatus of the invention.

FIG. 9 shows a printer 16 according to a seventh embodiment of the invention. An external bar-code reader 32 reads the code and transmits it via radio signal to an internal antenna 34 integral with the printer. The internal antenna is thus the receiver 9. The reader 32 has a slit 32a through which the recording medium 10 is passed to read the bar code 10a.

Again, there is no external machine in this embodiment.

Eighth Embodiment

Figure 11:
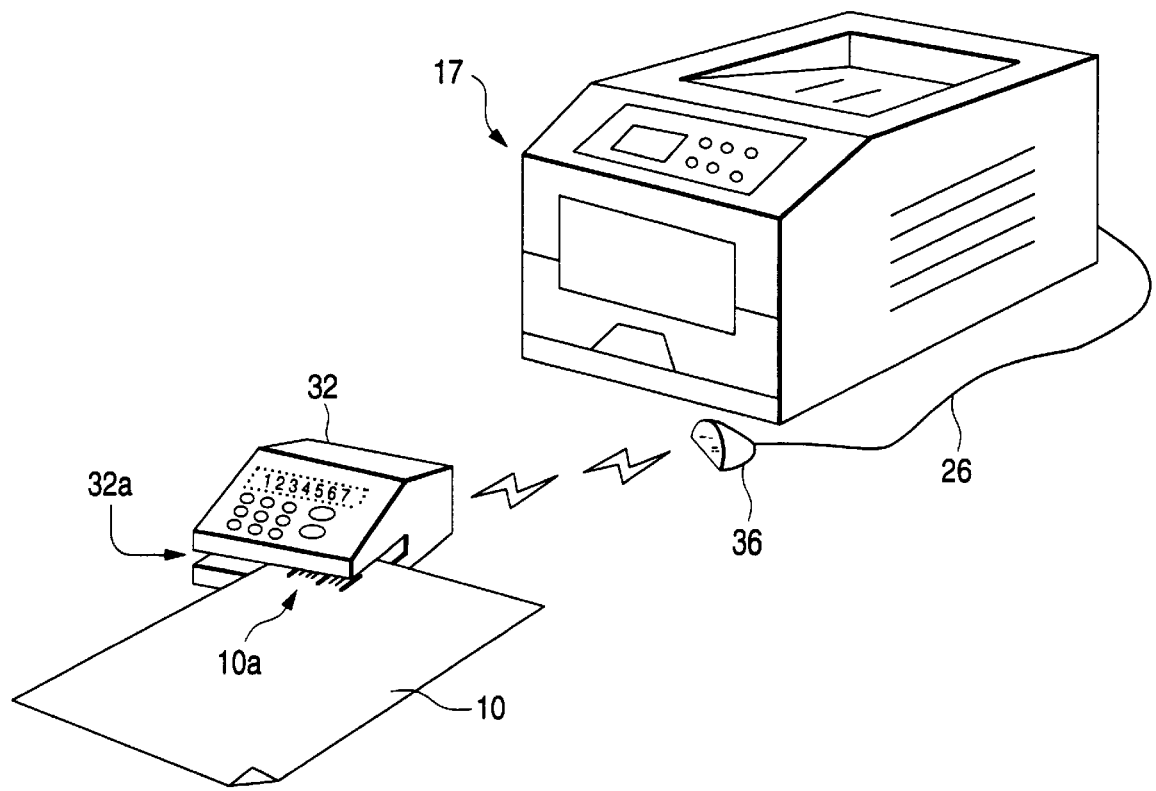
FIG. 11 is a perspective view showing an eighth embodiment of the image forming apparatus of the invention.

FIG. 11 shows a printer 17 according to an eighth embodiment of the invention. The eighth embodiment differs from the seventh in that an external receiver 36 connected to the printer 17 via wiring 26 receives a radio signal from a bar-code reader 32 in the eighth embodiment. By contrast, in the seventh embodiment the signal of the bar code 10a is input via the internal antenna 34, etc., of the printer 16 as a radio signal from the bar-code reader 32.

Ninth Embodiment

Figure 12:
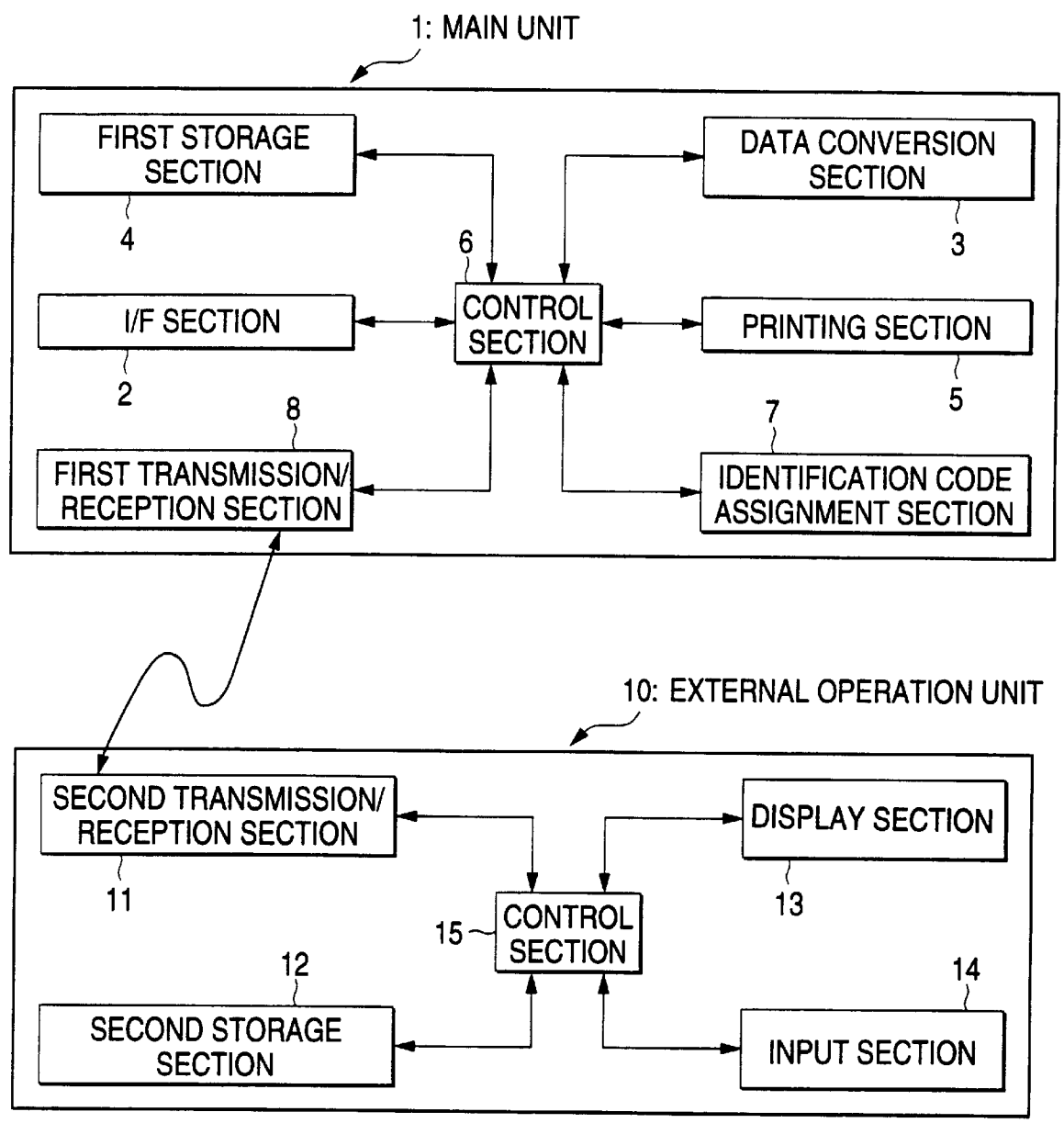
FIG. 12 is a schematic block diagram showing a general configuration of embodiments of FIGS. 13A and B.

FIG. 12 is a schematic block diagram showing an image forming apparatus according to a ninth embodiment of the invention. The image forming apparatus comprises a main unit 1 that is structurally similar to the image-forming apparatus of previous embodiments and an external operation unit 10. The main unit 1 is provided with an I/F section 2, a data conversion section 3, a first storage section 4, a printing section 5, a control section 6, an identification code assignment section 7, and a first transmission/reception section 8. The external operation unit 10 is provided with a second transmission/reception section 11, a second storage section 12, a display section 13, an input section 14, and a control section 15.

The I/F section 2, first storage section 4, data conversion section 3, printing section 5, identification code assignment section 7, and control section 6 function as previously described for their counterparts in the schematic of FIG. 1. The control section 6 controls the entire main unit 1.

The first transmission/reception section 8 of the main unit and the second transmission/reception section 11 of the external operation unit 10 transmit and receive data such as identification codes by a wireless communication method such as infrared rays, radio waves, etc.

In the external operation unit, the second storage section 12 stores programs required for controlling the entire external operation unit 10 and data such as identification codes received by the second transmission/reception section 11. The display section 13 is a section for displaying characters and digits, for example, identification codes. The input section 14 is a section for entering identification codes. This section may be made up of ten keys, character entry enabling keys, an enter button, etc., as shown in FIG. 13A.

In embodiments to which the schematic of FIG. 12 apply, a print image and an identification code are printed on a recording medium and, at the same time, are stored in the first storage section 4. Thus, if it becomes necessary to re-print the image, the identification code printed on the recording medium is simply entered through the input section 14 of the external operation unit or the identification code stored in the second storage section 12 is simply displayed on the display section 13 and then an input command is given. In the ninth embodiment of FIG. 13A, the input command is initiated by pressing the enter button. The second reception/transmission section 11 transmits the command to the first reception/transmission section 8. The image is retrieved from storage 4 and reprinted.

Figure 13A:
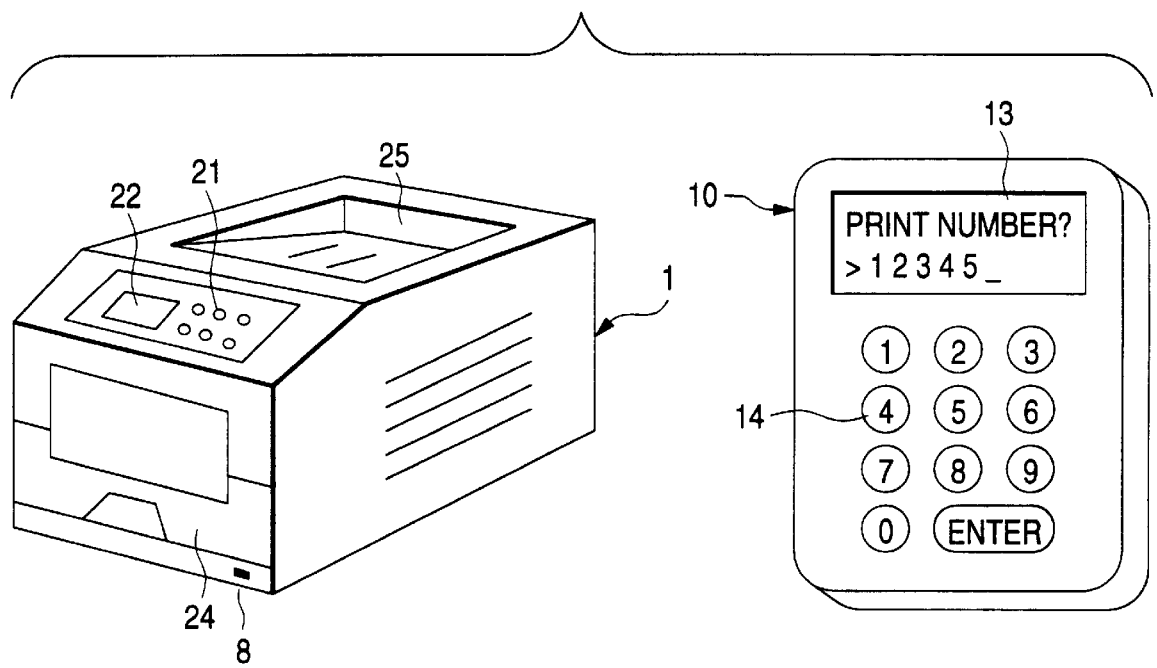
FIG. 13A is a schematic perspective view showing an image forming apparatus and an external operation unit according to a ninth embodiment of the invention.

In FIG. 13A both the main unit 1 and the external operation unit 10 are shown. The main unit 1 has an operation panel 21, a display section 22, a tray (not shown) as a cassette paper feed section, a cassette 24, and a recording medium discharge section 25. FIG. 13A also shows the first transmission/reception section 8 on the front.

All printing formats described for embodiments of the schematic of FIG. 1 apply to embodiments of FIG. 12. However, since the identification code read section of FIG. 1 is replaced with a first transmission reception section in FIG. 12, formats (5) and (6) as previously described for FIG. 1 are better understood for FIG. 12 as follows:

(5) Where a print command is entered through the external operation unit 10, only the print image is printed on a recording medium and not the identification code. By using this format, the presence of an identification code on the printed document indicates that it is an original.

(6) Where a print command is entered through the external operation unit 10, both the print image and identification code are printed on the recording medium. In this case, each page of the re-print can be individually entered into the external operation unit 10 to be re-printed.

Embodiments with a network control means described for FIG. 1 also apply to FIG. 12, except that in FIG. 12, the identification code is entered into the external operation unit instead of being read by a code reader as in FIG. 1. Security methods such as print-protect means described herein may also be applied.

In certain embodiments information related to a particular print image, such as a title or document number, may also be transmitted between the first transmission/reception section 8 and the second transmission/reception section 11. This descriptive data is stored in a second storage section 12 and can be displayed with the identification code on a display section 13. Such embodiments provide rough information on the print image corresponding to the identification code on the display so that the user need not check the recording medium at the time of printing for such information. Accordingly, the printing time can be drastically reduced.

Tenth Embodiment

Figure 13B:
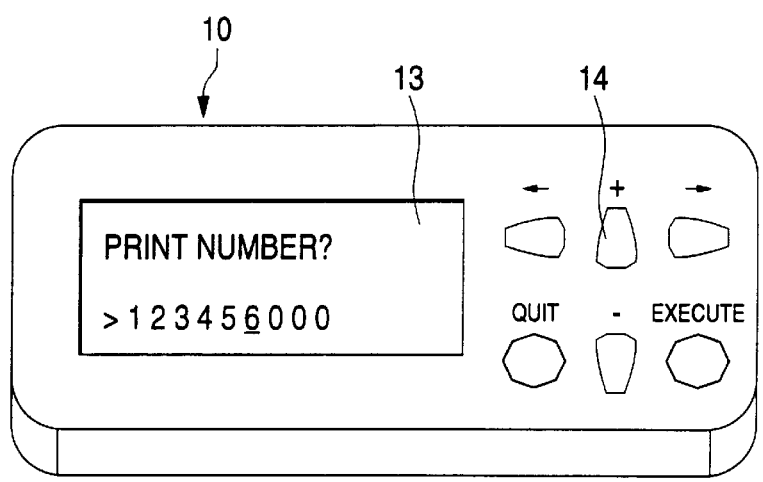
FIG. 13B is a schematic perspective view showing an external operation unit according to a tenth embodiment of the invention.

The schematic of FIG. 12 also applies to the tenth embodiment as shown in FIG. 13B. Here, commands can be entered on an input section 14 of an external operation unit 10 configured similar to operation panel 21 of the main unit 1. In this way, the main unit 1 can be operated by remote control.

The tenth embodiment differs from the ninth embodiment as follows:

(1) The printing section 5 does not print the identification code. PATENT
(2) The identification code is not entered through the input section 14.

In certain embodiments of FIG. 13A, the identification code is not printed on recording media and is not entered through the input section 14 of the external operation unit. Instead, the identification code stored in the second storage section 12 can be displayed on the display section 13 of the external operation unit of the embodiment of FIG. 13B, so that results similar to data entry in the ninth embodiment occur.

Eleventh Embodiment

Figure 14:
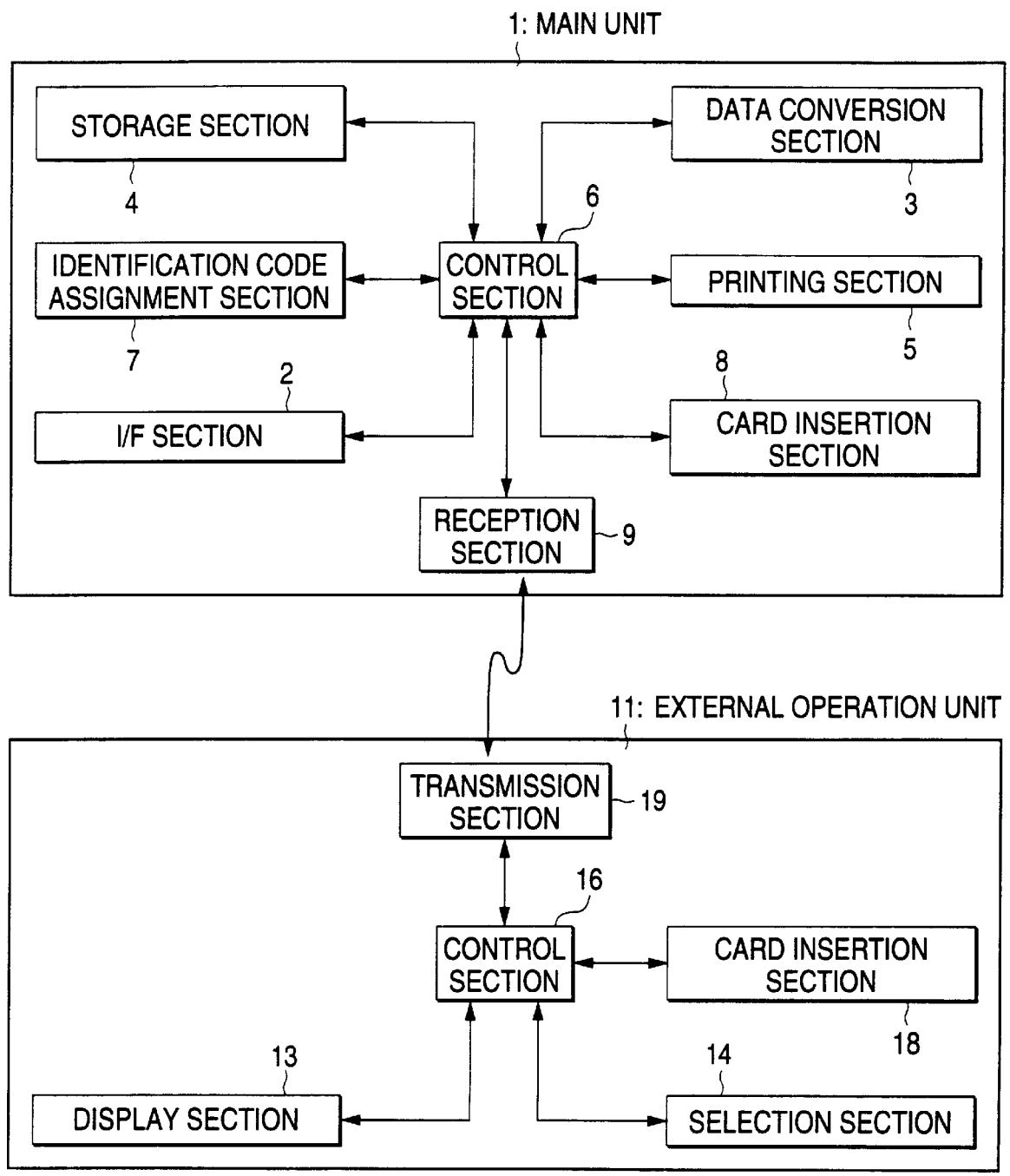
FIG. 14 is a schematic block diagram showing a general configuration of an image forming apparatus according to an eleventh embodiment of the invention.

FIG. 14 is a schematic block diagram showing an eleventh embodiment of an image forming apparatus of the invention. The image forming apparatus comprises a main unit 1 and an external operation unit 11. In the main unit 1 the I/F section 2, data conversion section 3, storage section 4, printing section 5 and identification code assignment section 7 function as described in previous embodiments. In the external operation unit 11 the display section 13 and control section 16 function as described in previous embodiments.

However in this embodiment the main unit further includes a card insertion section 8, which is a slot into which a readable/writable card can be inserted. When the card is inserted into the card insertion section 8, the identification code assigned by the identification code assignment section 7 is written onto the card as data. Written identification codes may continue to be stored until the card fills with data. A card containing an identification code can be inserted into the card insertion section 18 of the external operation unit 11, which reads the identification code and displays it on the display section. The selection section 14 is a section made up of ten keys, etc., allowing the user to select one of the identification codes displayed on the display section 13. Data such as selected identification codes is transmitted by the transmission section 19 of the external operation unit 11 to the reception section 9 of the main unit in a wireless manner.

According to the embodiment, the print image and its corresponding identification code are stored in the storage section 4 at the time they are written onto a card inserted into the card insertion section 8. Thus, images can be re-printed using the card as a data input method for the external operating unit 11.

In this embodiment, the identification code is written onto the card and not printed on recording medium. However, when an image is printed, it is an option to print its corresponding identification code. In such a case, an operator viewing the recording medium would know what image data corresponds to a given identification code. Accordingly, the identification code can be selected on the selection section 14, and the selection time can be drastically reduced.

In another embodiment, other information related to the print image can be written onto the card at the same time as the identification code is written. Such other information may include title, document number, the document name, creation date, the creator (user name), or the file name of an external machine such as a personal computer. This other information may also be displayed on the display section 13. This rough information about the print image can be viewed when the identification code is selected on a selection section 14. Since it is not necessary for the operator to check the recording medium to obtain this information, the time for selection can be drastically reduced.

Twelfth Embodiment

Figure 15:
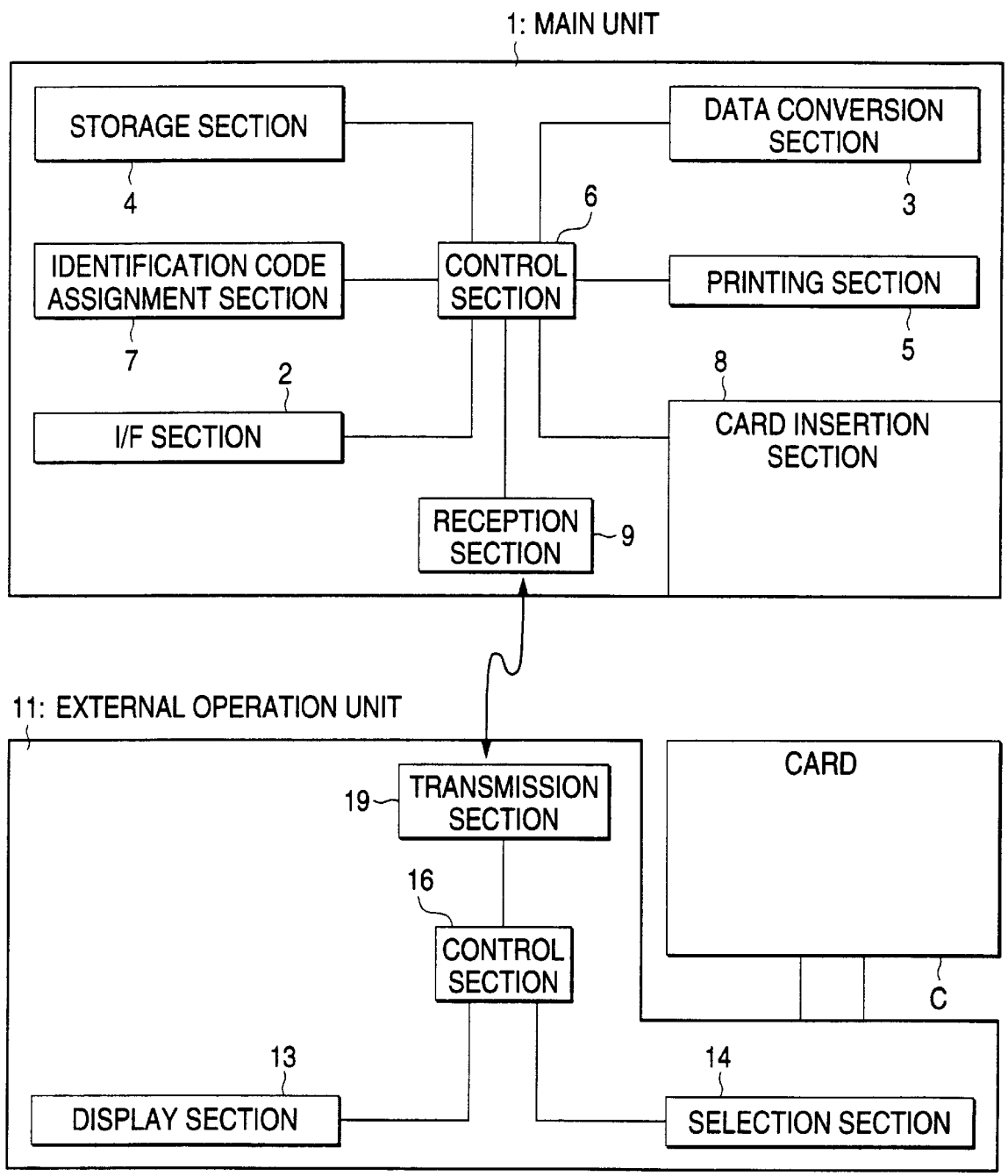
FIG. 15 is a schematic block diagram showing a general configuration of an image forming apparatus according to a twelfth embodiment of the invention.

FIG. 15 shows a twelfth embodiment. This embodiment is characterized by the fact that the card is integral with the external operation unit 11. Accordingly, the external operation unit 11 does not include a card insertion section as does the eleventh embodiment and is integral with a card C. Thus, time and effort for inserting the card C into the external operation unit 11 after the card C is inserted into a main unit 1 can be saved.

Thirteenth Embodiment

Figure 16:
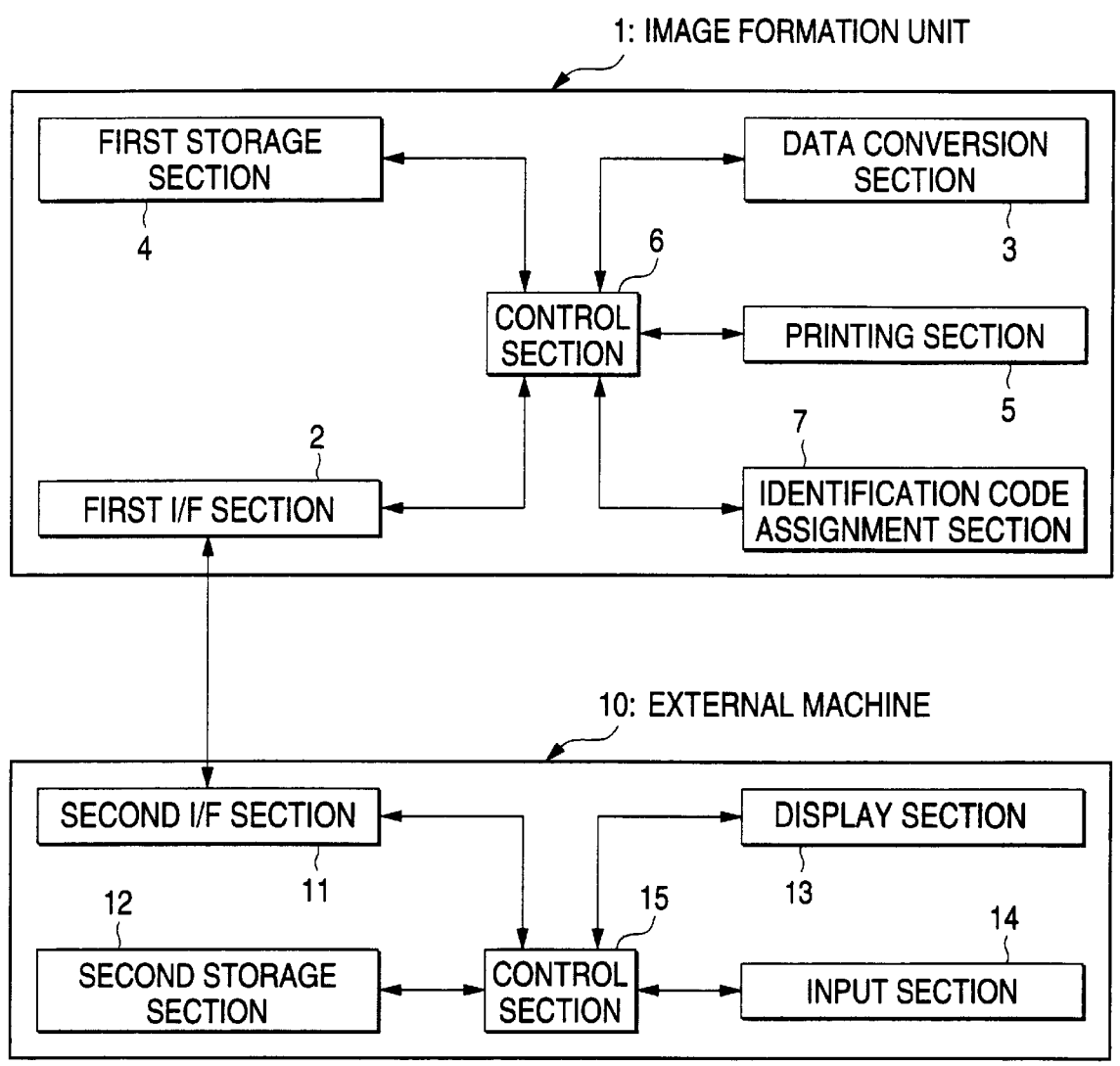
FIG. 16 is a schematic block diagram showing a general configuration of an image forming system according to a thirteenth embodiment of the invention.

FIG. 16 shows the thirteenth embodiment which is an image forming system including an image forming apparatus 1 and an external machine 10 for example, a personal computer. In the image forming apparatus 1 the data conversion section 3, the first storage section 4, the printing section 5, the control section 6 and the identification code assignment section 7 all function as previously described herein. The external machine 10 is provided with a second storage section 12, a display section 13, an input section 14, and a control section 15.

The image forming apparatus further includes a first I/F section 2. The external machine further includes a second I/F section 11. The first I/F section 2 is connected to the second I/F section 11 of the external machine 10 via a cable or in a wireless manner and receives image data to be printed from the external machine 10 and transmits and receives data such as identification codes, etc.

The second storage section 12 stores programs required for controlling the entire external machine 10 and data such as identification codes, etc., received by the second I/F section 12.

The input section 14, is a normal keyboard that enables the user to prepare an image and select one of the identification codes displayed on the display section 13.

According to the invention, a print image and its corresponding identification code are stored in the first storage section 4 at the time they are stored in the second storage section 12. Thus, to re-print an image, the identification codes are displayed on the display section 13 and the desired identification code is selected through the selection section 14. Thus the correct print image can be retrieved from the first storage section 4 via the link between second I/F section 11 and the first I/F section 2.

In another embodiment, other information related to the print image can be displayed as previously described with the same resulting benefits.

Fourteenth Embodiment

Figure 17:
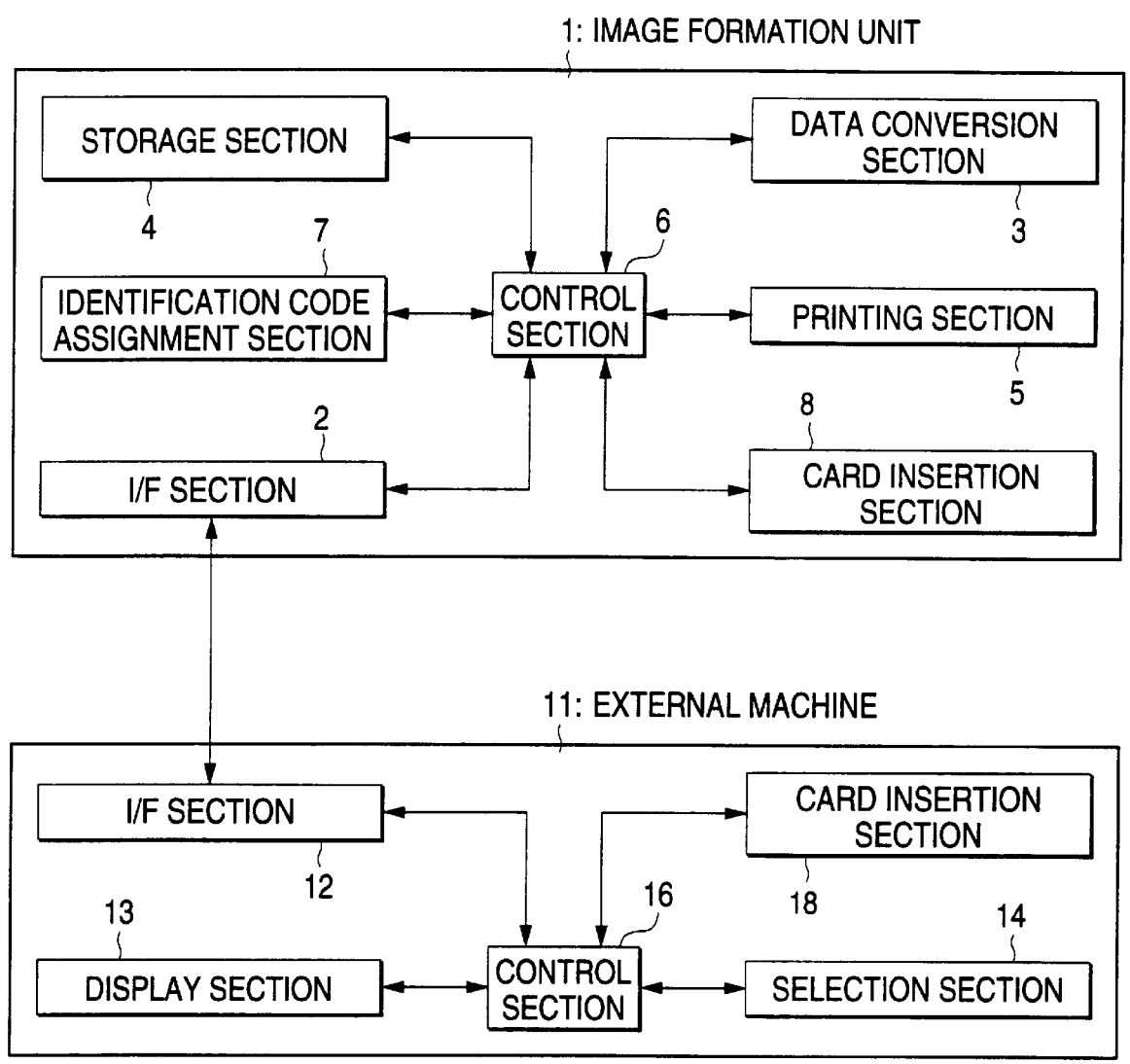
FIG. 17 is a schematic block diagram showing a general configuration of an image forming system according to a fourteenth embodiment of the invention.

FIG. 17 shows the fourteenth embodiment. This embodiment is similar to the thirteenth embodiment previously described herein with certain distinctions including the following. The image information unit and the external machine are each provided card insertion sections 8, 18 as described previously in the eleventh embodiment. In the external machine 11, the card insertion section provides identification code information and thus, the second storage section of the thirteenth embodiment is not included in the fourteenth embodiment.

Information is stored on the card and is passed between the image forming unit 1 and the external machine 10 via a readable/writable card as previously described herein.

The benefits of the card system are as described in the eleventh embodiment. In another embodiment other information related to the print image in addition to the identification code is written onto the card and used by the system as previously described herein.

Fifteenth Embodiment

Figure 18:
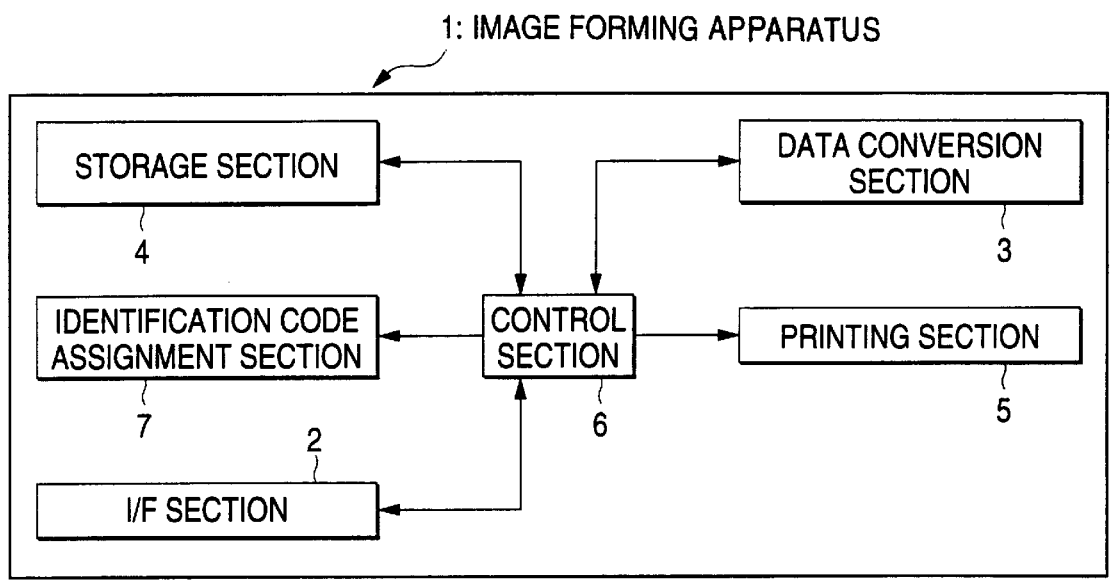
FIG. 18 is a schematic block diagram showing a general configuration of an image forming apparatus according to a fifteenth embodiment of the invention.
Figure 19:
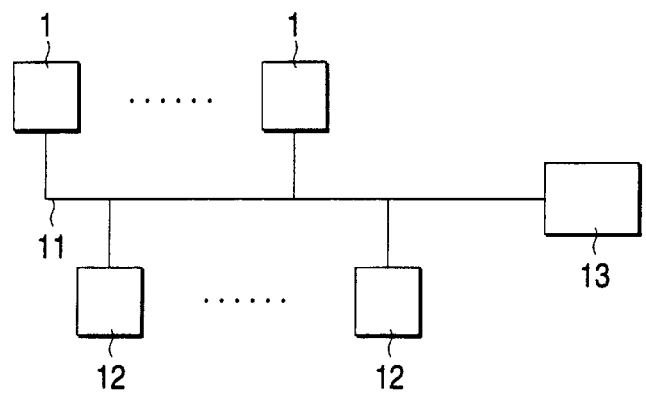
FIG. 19 is a schematic block diagram showing an embodiment of an image forming system of the invention.

FIGS. 18 and 19 show the fifteenth embodiment. Here, the I/F section 2 is connected to a network bus line 11 for receiving image data to be printed from an information processing unit 12 and identification code data from a terminal adapter unit 13. Other components are as previously described herein.

FIG. 19 is a schematic block diagram showing an image forming system of the invention. The image forming system comprises a plurality of information processing units 12, a plurality of image forming apparatus 1, and a terminal adapter unit 13 connected by a bus line 11.

According to the invention, each image forming apparatus 1 stores a print image and its corresponding identification code in a storage section 4 and at the same time, prints the identification code on a recording medium in a printing section 5. Thus, if it becomes necessary to re-print, the identification code printed on the recording medium is simply transmitted from an external machine to the terminal adapter unit 13, whereby the print image corresponding to the identification code can be retrieved from the storage section 4 via the I/F section 2 and printed.

If the terminal adapter unit 13 is connected to a public switched line, the external machine may be a machine which enables the user to enter characters, digits, or symbols as an identification code and can be connected to a telephone line or can communicate with a base station. For example, an information processing machine such as a personal computer, a telephone, a portable telephone, or a portable terminal may be used. If the terminal adapter unit 13 executes wireless reception, the external machine may be a machine which enables the user to enter characters, digits, or symbols as an identification code and can execute wireless transmission. For example, a radio cordless telephone may be used.

After the print image corresponding to the identification code is retrieved from the storage section 4, the image forming apparatus may print the image. This print image may be transmitted to another image forming apparatus over the bus line 11 for re-printing at this other image forming apparatus.

Further, a print end message can be transmitted from the terminal adapter unit 13 to the external machine, after the external machine issues a command to terminate printing. The user of the external machine can check whether or not the printing is complete without having to be in the vicinity of the image forming apparatus. A printed identification code is transmitted together with the print end message and is stored in the external machine. This code can be used to specify re-printing the same print image. The reception history can be archived in an electronic filing system.

Sixteenth Embodiment

Figure 20:
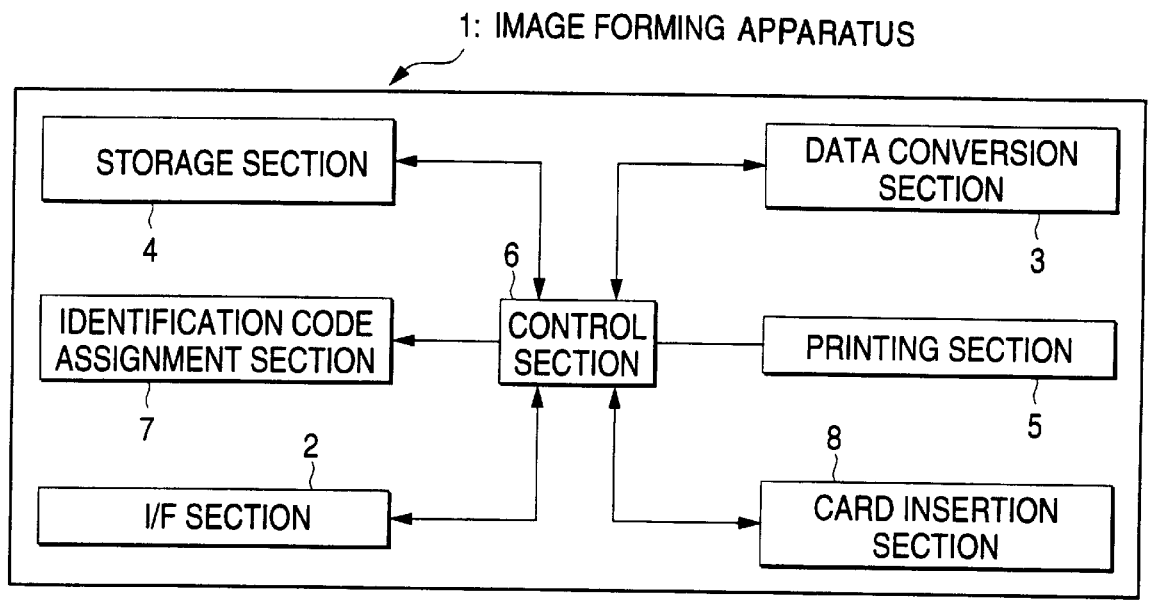
FIG. 20 is a schematic block diagram showing a general configuration of an image forming apparatus according to a sixteenth embodiment of the invention.

FIG. 20 shows the sixteenth embodiment. The sixteenth embodiment differs from the fifteenth embodiment in that the sixteenth embodiment includes a card insertion section 8.

As in the fifteenth embodiment, the I/F section 2 of the sixteenth embodiment is connected to a network bus line for receiving image data to be printed from an information processing unit and identification code data from a terminal adapter unit.

The card insertion section 8 is as described in the fourteenth embodiment.

The image forming system comprises a plurality of information processing units 12, a plurality of image forming apparatus 1, and a terminal adapter unit 13 connected by a bus line 11 as shown in FIG. 19.

According to the invention, each image forming apparatus 1 stores a print image and its corresponding identification code in the storage section 4 and at the same time, writes the identification code onto a card inserted into a card insertion section 8. Thus, if it becomes necessary to re-print, the user inserts the card into an external machine to be read, selects any desired identification code, and transmits the selected identification code to a terminal adapter unit 13, whereby the print image corresponding to the identification code can be retrieved from the storage section 4 via the I/F section 2 and can be re-printed.

If the terminal adapter unit 13 is connected to a public switched line, the external machine may be a machine into which a card may be inserted and can be connected to a telephone line or can communicate with a base station. For example, an information processing machine such as a personal computer, a telephone, a portable telephone, or a portable terminal may be used. If the terminal adapter unit 13 executes wireless reception, the external machine may be a machine into which a card may be inserted and one that can execute wireless transmission. For example, a radio cordless telephone may be used. The external machine may also be integral with a card in which case time and effort for inserting the card into the external machine after the card is inserted into a main unit 1 can be saved.

Benefits of the card system as previously described herein apply to the sixteenth embodiment. As also described previously, information other than the identification code can be stored on the card and read with the resulting benefits previously described.

This embodiment can also include a print and messages previously described.

Seventeenth Embodiment

Figure 21:
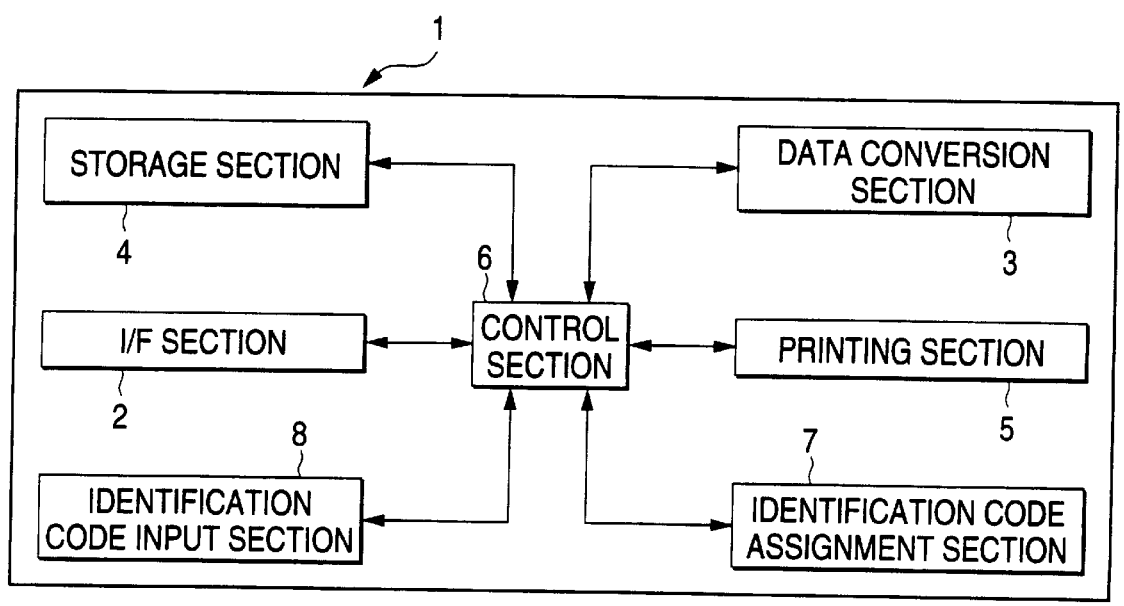
FIG. 21 is a schematic block diagram showing a general configuration of an image forming apparatus according to a seventeenth embodiment of the invention.
Figure 24:
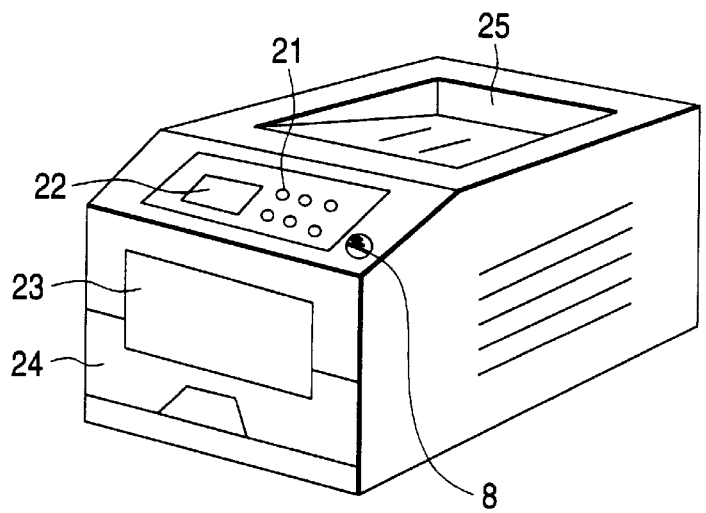
FIG. 24 is a perspective view of the image forming apparatus of FIG. 23.
Figure 25:
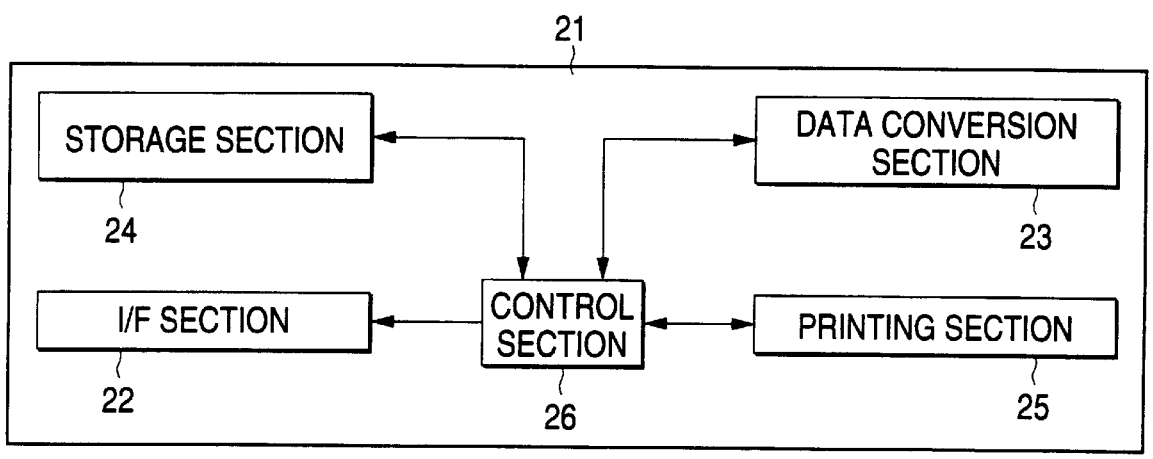
FIG. 25 is a schematic block diagram showing a conventional image forming unit.

FIG. 21 shows a schematic block diagram the seventeenth embodiment. This embodiment differs from embodiments described by the schematic of FIG. 1, in that identification codes are input in the input section 8 of FIG. 21, rather than being read by the read section of FIG. 1. Other sections function as previously described. The image forming apparatus of FIG. 24 is representative of the seventeenth embodiment, where identification is input into the operation panel 21 of the unit. All formats of printing identification codes previously described apply to this embodiment.

The control section 6 is a section for controlling the entire image forming apparatus 1.

Eighteenth Embodiment

Figure 22:
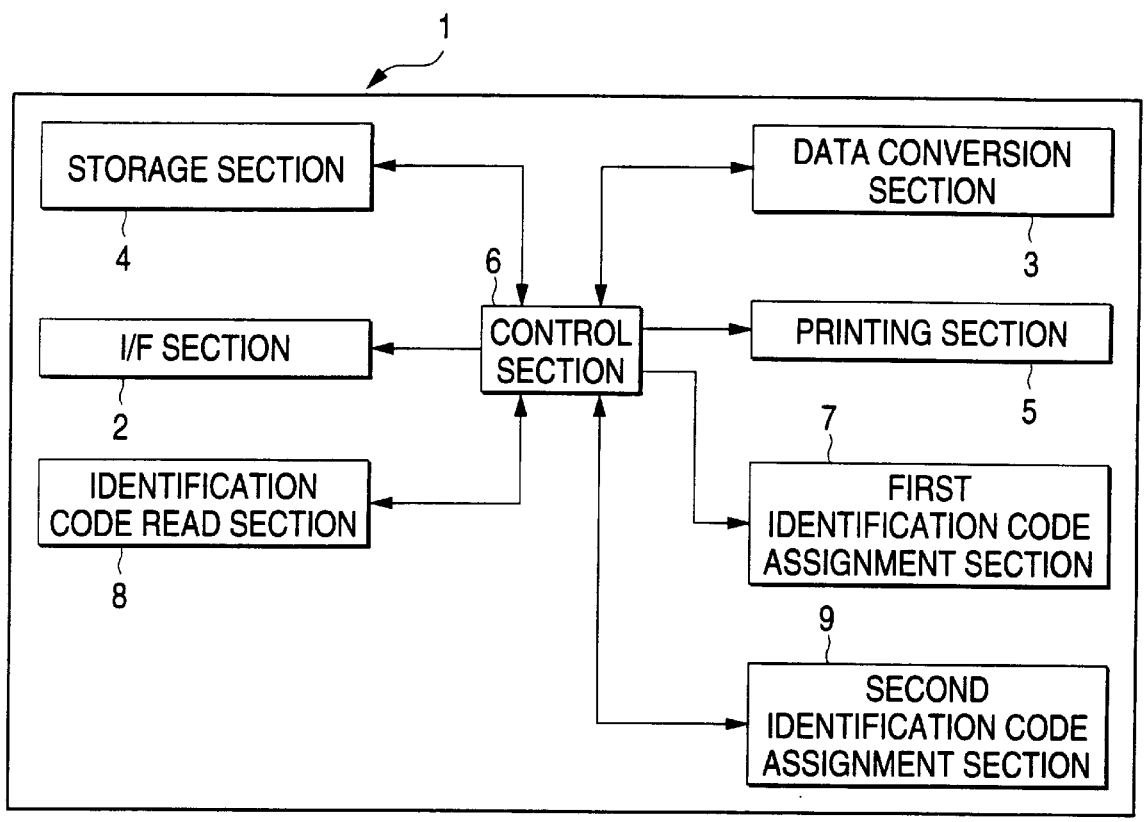
FIG. 22 is a schematic block diagram showing a general configuration of an image forming apparatus according to a eighteenth embodiment of the invention.

FIG. 22 shows the eighteenth embodiment. The sections of this embodiment that particularly differ from previous embodiments include multiple embodiments of an identification code read section 8 and two identification code assignment sections 7, 9. Other sections function as previously described.

The first identification code assignment section 7 assigns an identification code to a print image for each page unit or print job unit (namely, file unit) as previously described herein. The information contained in the identification code may be the serial number of a printer, the serial number of a document, a password, etc. The information may be compressed and encrypted.

The second identification code assignment section 9 assigns an identification code to the recording medium when the printing section 5 prints. Specifically, the identification code may be assigned in paint emitting infrared rays or transparent magnetic toner. The second identification code may be assigned instead of a first identification code in which case only the print images would be visible on the recording medium.

There are various embodiments of the identification code read section 8. For example, if the second identification code assignment section 9 assigns an identification code in paint emitting infrared rays, the identification code read section 8 is an infrared sensor. If the second identification code assignment section 9 assigns an identification code in magnetic toner, the identification code read section 8 is a magnetic reader.

According to the invention, a print image is printed on a recording medium. An identification code is assigned and at the same time, and both the image and the code are stored in the storage section 4. Thus, if it becomes necessary to re-print, the identification code assigned to the recording medium is simply read through the identification code read section 8, whereby the print image can be retrieved from storage and can be printed any number of times. Moreover, a transparent identification code can be assigned to the recording medium. The various formats of identification codes described herein that apply to this embodiment can also be included.

Nineteenth Embodiment

Figure 23:
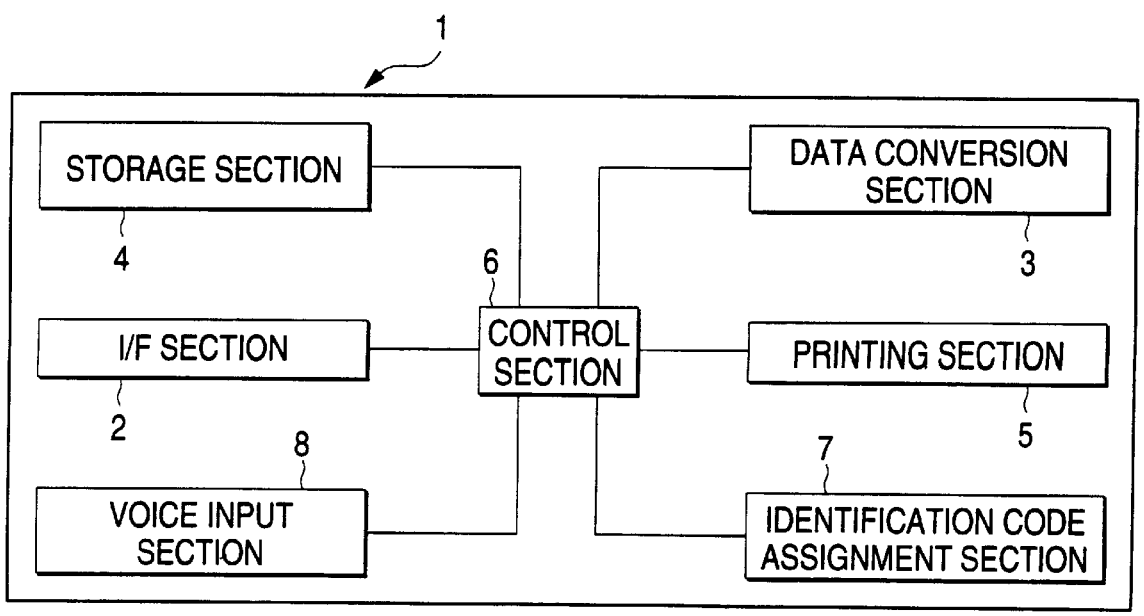
FIG. 23 is a schematic block diagram showing a general configuration of an embodiment of an image forming apparatus according to the nineteenth embodiment of the invention.

FIG. 23 shows the nineteenth embodiment. The voice input section 8 particularly differs from previous embodiments. Other sections function substantially the same as previously described.

The voice input section 8 receives an identification code entered by voice by the user and converts the input voice signal into identification code data of characters, digits, etc.

According to the invention, a print image and an identification code are printed on a recording medium are stored in the storage section 4. Thus, if it becomes necessary to re-print, the identification code printed on the recording medium is simply entered by voice input through the voice input section 8, whereby the print image can be retrieved from storage and re-printed. Various formats of identification codes described herein that apply to this embodiment can also be included.

FIG. 24 is a schematic perspective view to show the image forming apparatus according to the nineteenth embodiment. The image forming apparatus has an operation panel 21, a display section 22, a tray 23 as a cassette paper feed section, a cassette 24, and a recording medium discharge section 25. Further, it comprises the voice input section 8 on the front.

In certain embodiments, if the image forming apparatus of the invention is provided with network control means capable of also accessing other external machines and a read and output means capable of reading and outputting print images of other units. Thus, documents from other image forming apparatus units can also be printed and print images can be shared because the serial number of each image forming apparatus is contained in the identification code. If an identification code is entered through the voice input section of the nearest image forming apparatus, the print image corresponding to the identification code can be printed on the image forming apparatus.

If the correspondence between the alphanumeric strings as the serial numbers and the image forming apparatus is indicated, which image forming apparatus the document is printed at is known and if the identification code is entered through the voice input section 8 of the image forming apparatus, the document can be quickly printed.

Further, if the image forming apparatus is connected to a host, etc., and is provided with means that can respond to retrieval, read, and output instructions from the host, etc., the host can manage files and list the stored print image contents.

Further, if the image forming apparatus is provided with means that can respond to setting of copy protect from the host, etc., the security of print images can be maintained.

As we have discussed in detail, the image forming apparatus according to the invention can re-print any number of times with the same resolution as the original print and moreover in a shorten time than is possible with conventional system. These advantages are particularly useful for color printers, where an efficient image forming apparatus and image forming system can be provided.

What is claimed is:

1. An image forming apparatus for printing external image data, comprising:

a main unit including an identification code assignment section for assigning an identification code for each page unit or print job unit of print images, a printing section for printing the print image and its corresponding identification code on a recording medium, a first storage section for storing the print images and their corresponding identification codes, the storage section retaining the image and code after the image has been printed once, and a first transmission/reception section capable of transmitting and receiving the identification codes in a wireless manner;

an external operation unit including a second transmission/reception section capable of transmitting and receiving the identification codes to and from the first transmission/reception section in a wireless manner, a second storage section for storing the identification codes received at the second transmission/reception section, a display section for displaying the identification codes received at the second transmission/reception section or the identification codes stored in the second storage section, and an input section through which an identification code can be entered, wherein the identification code entered through the input section or the identification code displayed on the display section is transmitted from the second transmission/reception section to the first transmission/reception section, the print image corresponding to the identification code is retrieved from the first storage section, and the print image or the print image and the identification code are printed on a recording medium in the printing section;

a network control means capable of accessing the external operation unit of other image forming apparatus; and a read and output means capable of reading and outputting the print images stored in other image forming apparatus, wherein the identification code for each page unit or print job unit contains a serial number of the image forming apparatus where the document is stored, and wherein a document stored in another image forming apparatus is read and printed when the serial number of the other image forming apparatus is contained in the identification code.

2. An image forming apparatus for printing external image data, comprising:

a main unit including an identification code assignment section for assigning an identification code for each page unit or print job unit of print images, a printing section for printing the print image on a recording medium, a first storage section for storing the print images and their corresponding identification codes, the first storage section retaining the image and code after the image has been printed once, and a first transmission/reception section capable of transmitting and receiving the identification codes in a wireless manner;

an external operation unit including a second transmission/reception section capable of transmitting and receiving the identification codes to and from the first transmission/reception section in a wireless manner, a second storage section for storing the identification codes received at the second transmission/reception section, and a display section for displaying the identification codes received at the second transmission/reception section or the identification codes stored in the second storage section, wherein the identification code displayed on the display section is transmitted from said second transmission/reception section to the first transmission/reception section and the print image corresponding to the identification code is retrieved from the first storage section and is printed on a recording medium in the printing section;

a network control means capable of accessing the external operation unit of other image forming apparatus; and a read and output means capable of reading and outputting the print images stored in other image forming apparatus, wherein the identification code for each page unit or print job unit contains a serial number of the image forming apparatus where the document is stored and wherein a document stored in another image forming apparatus is read and printed when the serial number of the other image forming apparatus is contained in the identification code.

3. The image forming apparatus as claimed in claim 1, wherein the identification code and information related to its corresponding print image are transferred between the first and second transmission/reception sections, are stored in the second storage section, and are displayed on the display section.

4. The image forming apparatus as claimed in claim 2, wherein the identification code and information related to its corresponding print image are transferred between the first and second transmission/reception sections, are stored in the second storage section, and are displayed on the display section.

5. The image forming apparatus as claimed in claim 1, wherein a control command of said main unit can be entered through said input section.

6. The image forming apparatus as claimed in claim 3, wherein a control command of said main unit can be entered through said input section.

7. An image forming apparatus for converting external image data into a print image and printing the image, the apparatus comprising:

a main unit including an identification code assignment section for assigning an identification code for each page unit or print job unit of print images, a printing section for printing the print image on a recording medium, a storage section for storing the print images and their corresponding identification codes, the storage section retaining the image and code after the image has been printed once, a wireless reception section capable of receiving identification codes in a wireless manner, and a card insertion section for slidably receiving a readable/writable card, the card insertion section adapted to write the identification code onto an inserted card;

an external operation unit including a transmission section for transmitting identification codes to the reception section in a wireless manner, a card insertion section for slidably receiving a readable/writable card having the identification code written thereon, a display section for displaying the identification codes written on the card, and a selection section for selecting the identification code displayed on the display section, wherein the identification code selected through the selection section is transmitted from the transmission section to the reception section and the print image corresponding to the identification code is retrieved from the storage section and is printed;

a network control means capable of accessing the external operation unit of other image forming apparatus; and a read and output means capable of reading and outputting the print images stored in other image forming apparatus, wherein the identification code for each page unit or print job unit contains a serial number of the image forming apparatus where the document is stored, and wherein a document stored in another image forming apparatus is read and printed when the serial number of the other image forming apparatus is contained in the identification code.

8. An image forming apparatus for converting external image data into a print image and printing the image, the apparatus comprising:

a main unit including an identification code assignment section for assigning an identification code for each page unit or print job unit of print images, a printing section for printing the print image on a recording medium, a storage section for storing the print images and their corresponding identification codes, the storage section retaining the image and code after the image has been printed once, a wireless reception section capable of receiving identification codes in a wireless manner, and a card insertion section for receiving a readable/writable card, the card insertion section adapted to write the identification code onto an inserted card;

an external operation unit integral with the card including a transmission section for transmitting identification codes to the reception section in a wireless manner, a display section for displaying the identification codes written on the card, and a selection section for selecting one from among the identification codes displayed on the display section, wherein the identification code selected through the selection section is transmitted from the transmission section to the reception section and the print image corresponding to the identification code is retrieved from the storage section and is printed;

a network control means capable of accessing the external operation unit of other image forming apparatus; and a read and output means capable of reading and outputting the print images stored in other image forming apparatus, wherein the identification code for each page unit or print job unit contains a serial number of the image forming apparatus where the document is stored, and wherein a document stored in another image forming apparatus is read and printed when the serial number of the other image forming apparatus is contained in the identification code.

9. The image forming apparatus as claimed in claim 7, wherein said main unit can write identification codes and their relevant information onto a card and wherein said display section of said external operation unit displays the identification codes and their relevant information.

10. The image forming apparatus as claimed in claim 8, wherein said main unit can write identification codes and their relevant information onto a card and wherein said display section of said external operation unit displays the identification codes and their relevant information.

11. An image forming system comprising an external machine for preparing image data, and an image forming apparatus for receiving image data from the external machine and printing the image data, the image forming apparatus comprising:
a first interface section for receiving image data, and transmitting and receiving identification codes;
an identification code assignment section for assigning an identification code for each page unit or print job unit of print images;
a printing section for printing the print image on a recording medium; and
a first storage section for storing the print images and their corresponding identification codes, the first storage section retaining the image and code after the image has been printed once, the external machine comprising:
a second interface section for transmitting image data and for transmitting and receiving identification codes,
a second storage section for storing the identification codes received at the second interface section,
a display section for displaying the identification codes stored in the second storage section, and
a selection section for selecting the identification code displayed on the display section,
wherein the identification code selected through the selection section is transmitted from the second interface section to the first interface section and the print image corresponding to the identification code is retrieved from the first storage section and is printed;

a network control means capable of accessing the external machines of other image forming apparatus; and a read and output means capable of reading and outputting the print images stored in other image forming apparatus, wherein the identification code for each page unit or print job unit contains a serial number of the image forming apparatus where the document is stored, and wherein a document stored in another image forming apparatus is read and printed when the serial number of the other image forming apparatus is contained in the identification code.

12. The image forming system as claimed in claim 11, wherein the identification code and information related to its corresponding print image are transferred between the first and second interface sections, are stored in the second storage section, and are displayed on the display section.

13. An image forming system comprising an external machine for preparing image data, and an image forming apparatus for receiving the image data from the external machine and converting the image data into a print image for printing, the image forming apparatus comprising:
an interface section for receiving image data;
an identification code assignment section for assigning an identification code for each page unit or print job unit of the print image;
a printing section for printing the print image on a recording medium;
a storage section for storing the print images and their corresponding identification codes, the storage section retaining the image and code after the image has been printed once, and
a card insertion section for slidably receiving a readable/writable card, the card insertion section adapted to write the identification code onto an inserted card, the external machine comprising:
an interface section for transmitting image data, identification code data;
a card insertion section for slidably receiving the readable/writable card having the identification code written thereon;
a display section for displaying the identification code written on the card;
a selection section for selecting the identification code displayed on the display section,
wherein the identification code selected through the selection section is transmitted from the interface section of the external machine to the interface section of the image forming apparatus and the print image corresponding to the identification code is retrieved from the storage section and is printed;

a network control means capable of accessing the external machines of other image forming apparatus; and a read and output means capable of reading and outputting the print images stored in other image forming apparatus, wherein the identification code for each page unit or print job unit contains a serial number of the image forming apparatus where the document is stored, and wherein a document stored in another image forming apparatus is read and printed when the serial number of the other image forming apparatus is contained in the identification code.

14. The image forming system as claimed in claim 13, wherein the image forming apparatus can write identification codes and their relevant information onto the card and wherein the display section of the external machine displays the identification codes and their relevant information.

15. An image forming system comprising:
at least one information processing unit for preparing image data received from an external machine;
at least one image forming apparatus for receiving image data from the image processing unit and converting the image data into a print image for printing, the image formatting apparatus operationally connected to the image processing unit by a network;
a terminal adapter unit capable of executing speed or protocol conversion for conducting data communication with the external machine in a wireless or wire manner to receive an identification code from an external machine and transmit the code to the image forming apparatus, the terminal adapter unit connected to the information processing unit and the image forming apparatus by a network,
the image forming apparatus comprising:
an interface section for receiving image data prepared by the information processing unit and identification code data from the terminal adapter unit;
an identification code assignment section for assigning an identification code for each page unit or print job unit of print images;
a printing section for printing the print images and their corresponding identification codes on a recording medium;
a storage section for storing the print images and their corresponding identification codes;
wherein, when identification code data is received at the terminal adapter unit from the external machine, the identification code is transmitted to the image forming apparatus and the print image corresponding to the identification code is retrieved from the storage section of the image forming apparatus storing the identification code and is printed at the image forming apparatus;
a network control means capable of accessing the external machines of other image forming apparatus; and
a read and output means capable of reading and outputting the print images stored in other image forming apparatus, wherein the identification code for each page unit or print job unit contains a serial number of the image forming apparatus where the document is stored and wherein a document stored in another image forming apparatus is read and printed when the serial number of the other image forming apparatus is contained in the identification code.

16. An image forming system comprising:
at least one information processing unit for preparing image data received from an external machine;
at least one image forming apparatus for receiving image data from the image processing unit and converting the image data into a print image for printing, the image formatting apparatus operationally connected to the image processing unit by a network; and
a terminal adapter unit capable of executing speed or protocol conversion for conducting data communication with the external machine in a wireless or wire manner, the terminal adapter unit connected to the information processing unit and the image forming apparatus by a network,
the image forming apparatus comprising:
an interface section for receiving image data prepared by the information processing unit;
an identification code assignment section for assigning an identification code for each page unit or print job unit of print images;
a printing section for printing the print images and their corresponding identification codes on a recording medium;
a storage section for storing the print images and their corresponding identification codes, the storage section retaining the image and code after the image has been printed once;
a card insertion section for slidably receiving a readable/writable card, having the identification code with or without additional information;
wherein, when identification code data is received at the terminal adapter unit from the external machine, the identification code is transmitted to the image forming apparatus and the print image corresponding to the identification code is retrieved from the storage section of the image forming apparatus storing the identification code and is printed at the image forming apparatus;
a network control means capable of accessing the external machines of other image forming apparatus; and
a read and output means capable of reading and outputting the print images stored in other image forming apparatus, wherein the identification code for each page unit or print job unit contains a serial number of the image forming apparatus where the document is stored and wherein a document stored in another image forming apparatus is read and printed when the serial number of the other image forming apparatus is contained in the identification code.

17. An image forming apparatus for printing external image data, said apparatus comprising:
an identification code assignment section for assigning an identification code consisting of characters, digits, etc, for each page unit or print job unit of print images;
a printing section for printing the print images and its corresponding identification code on a recording medium;
a storage section for storing the print images and their corresponding identification codes;
a voice input section through which voice can be entered,
wherein the print image corresponding to the identification code entered through said voice input section is retrieved from the storage section and the print image or the print image and the identification code are printed on a recording medium in said printing section;
a network control means capable of accessing the external machines of other image forming apparatus; and
a read and output means capable of reading and outputting the print images stored in other image forming apparatus, wherein the identification code for each page unit or print job unit contains a serial number of the image forming apparatus where the document is stored, and wherein a document stored in another image forming apparatus is read and printed when the serial number of the other image forming apparatus is contained in the identification code.

18. The image forming apparatus of claim 2, wherein the main unit further comprises a second identification code assignment section for applying a second identification code to a recording medium on which an image is printed, the second identification code applied to the recording medium being invisible to a human eye.

19. An image forming apparatus for printing external image data, comprising:

- an identification code assignment section for assigning an identification code for each page unit or print job unit of print images;
- a printing section for printing the print image and its corresponding identification code on a recording medium;
- a storage section for storing the print images and their corresponding identification codes, the storage section retaining the image and code after the image has been printed once;
- an identification code read section for reading the identification code printed on the recording medium,
- wherein the print image corresponding to the identification code read through the identification code read section is retrieved from the storage section and the print image or the print image with the identification code are printed on a recording medium in the printing section;
- a network control means capable of accessing another image forming apparatus; and
- a read and output means capable of reading and outputting the print images stored in other image forming apparatus, wherein the identification code for each page unit or print job unit contains a serial number of the image forming apparatus where the document is stored, and wherein a document stored in another image forming apparatus is read and printed when the serial number of the other image forming apparatus is contained in the identification code.

20. The image forming apparatus as claimed in claim 19, wherein the identification code is printed on all pages of the recording medium.

21. The image forming apparatus as claimed in claim 19, wherein the identification code is printed only on the first page of the recording medium.

22. The image forming apparatus as claimed in claim 19, wherein the identification code is printed on a trailer page following the last page of the print image in the print job.

23. The image forming apparatus as claimed in claim 19, the recording medium having a front face upon which the image data is printed and a back face, and wherein the identification code is printed on the back face of the recording medium.

* * * * *